United States Patent
Kawai et al.

(10) Patent No.: US 6,871,735 B2
(45) Date of Patent: Mar. 29, 2005

(54) REVERSE-INPUT SHUTOFF CLUTCH AND ROTATION DRIVE DEVICE

(75) Inventors: Masahiro Kawai, Mie-ken (JP); Masahiro Kurita, Mie-ken (JP); Seiichi Takada, Mie-ken (JP); Atsushi Yoshioka, Mie-ken (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/177,760

(22) Filed: Jun. 24, 2002

(65) Prior Publication Data

US 2003/0000796 A1 Jan. 2, 2003

(30) Foreign Application Priority Data

| Jun. 26, 2001 | (JP) | ........................................ | 2001-193336 |
| Aug. 9, 2001 | (JP) | ........................................ | 2001-242289 |
| Feb. 5, 2002 | (JP) | ........................................ | 2002-028324 |
| May 7, 2002 | (JP) | ........................................ | 2002-131708 |

(51) Int. Cl.[7] .......................... D06F 37/40; F16D 15/00
(52) U.S. Cl. .......................................... 192/38; 192/45
(58) Field of Search ............................. 192/38, 44, 36, 192/223.4, 45, 223.2

(56) References Cited

U.S. PATENT DOCUMENTS

| 2,028,512 A | | 1/1936 | Maier | |
| 2,784,821 A | | 3/1957 | Clark | |
| 3,055,471 A | * | 9/1962 | Warn et al. | .................... 192/38 |
| 3,380,563 A | * | 4/1968 | Bowers et al. | ................. 192/44 |
| 4,076,108 A | * | 2/1978 | Fogelberg | ..................... 192/44 |
| 4,354,585 A | * | 10/1982 | Ritter | .......................... 192/45 |
| 4,438,836 A | * | 3/1984 | Kagata | ......................... 192/44 |
| 5,307,911 A | * | 5/1994 | Robinson | ...................... 192/44 |
| 5,328,007 A | * | 7/1994 | Yokozuka et al. | ........ 192/223.4 |
| 5,355,981 A | * | 10/1994 | Itoh et al. | ...................... 192/38 |
| 6,000,512 A | * | 12/1999 | Cronin et al. | .................. 192/38 |
| 6,062,361 A | * | 5/2000 | Showalter | ..................... 192/38 |
| 6,530,447 B2 | * | 3/2003 | Seki et al. | ..................... 192/44 |
| 6,557,677 B2 | * | 5/2003 | Peura | .......................... 192/38 |

FOREIGN PATENT DOCUMENTS

| EP | 1 122 390 A2 | 8/2001 |
| JP | 08-177878 | 7/1996 |

* cited by examiner

*Primary Examiner*—Rodney H. Bonck
(74) *Attorney, Agent, or Firm*—Arent Fox PLLC

(57) ABSTRACT

A reverse-input shutoff clutch according to the invention includes an outer ring as an input-side rotation member, an inner ring as an output-side rotation member, rollers as torque transmission means, a cage for retaining the roller, a centering spring as an elastic member for positioning the cage, a housing as a stationary-side member, and a sliding spring coupled to and co-rotate with the cage while sliding against the housing. With the constitution described above, the clutch applies rotational resistance induced by friction resistance to the cage.

16 Claims, 23 Drawing Sheets

Section B-B

Section A-A

Section B-B

Section A-A

Section X-X

Section Y-Y

Section Z-Z

Section A-A

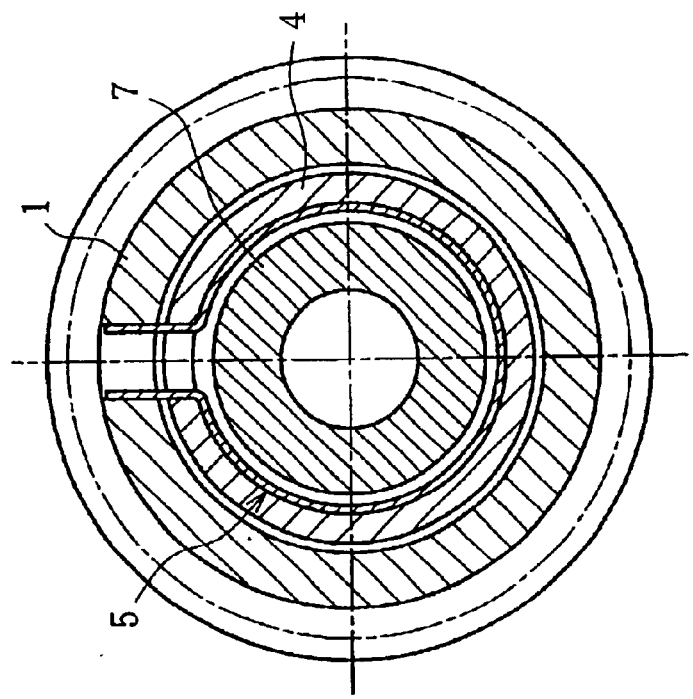
FIG. 24 (a)  Section B-B
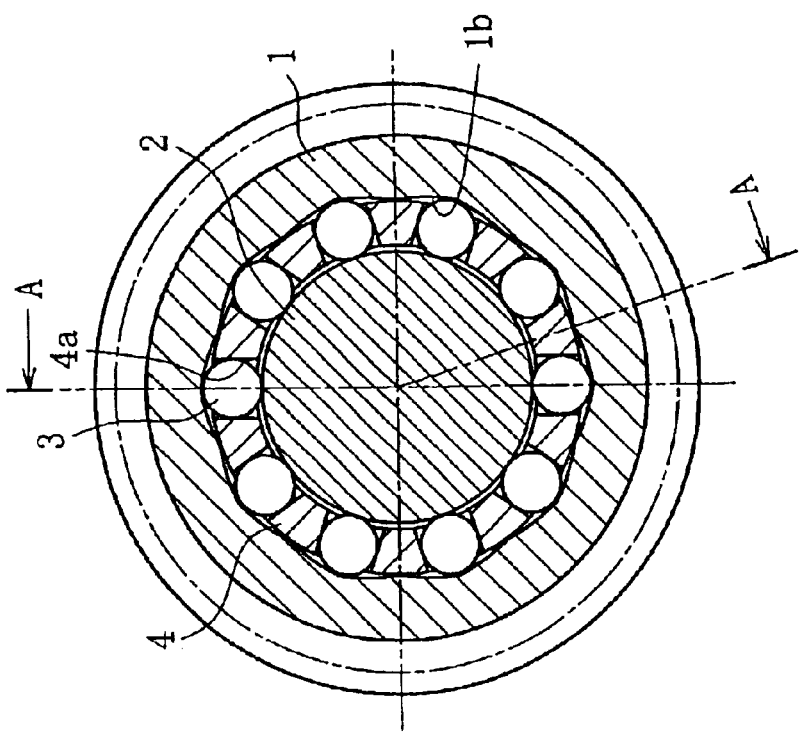
FIG. 24 (b)  Section C-C

REVERSE-INPUT SHUTOFF CLUTCH AND ROTATION DRIVE DEVICE

BACKGROUND OF THE INVENTION

1. Field of the Invention

The invention relates to a reverse-input shutoff clutch that transmits positive and negative rotational torque from the input side to the output side and does not transmits positive and negative rotational torque from the output side to the input side.

2. Description of the Related Art

More and more electricity-assisted type trolleys are used as delivery trolleys for home delivery service because of the reasons such as, for example, increasing amount of goods loaded on trolleys, aging delivery personnel, and assimilating women in the industry. It is preferable in this case that trolleys can be electrically assisted for both forward and backward movements and also manually operated when the drive power source is stopped.

Such a function can be realized using, for example, the clutch disclosed in Japanese Patent Laid-Open Publication No. Hei. 8-177878, a proposal made by the present applicant.

The clutch disclosed in the publication is, as shown in FIG. 23, and FIGS. 24(a) and 24(b), provided with an outer ring 1, an inner ring 2, a torque transmission member 3 that can be engaged with and disengaged from the outer ring 1 and the inner ring 2 in both positive and negative rotation directions, a cage 4 for retaining, through its rotation relative to the outer ring 1, the torque transmission member 3 and for controlling the engagement and disengagement of the torque transmission means 3, a centering spring 5 for connecting the outer ring 1 and the cage 4 in a rotation direction, a stationary-side member 7 fixed to a stationary system in a rotation direction, and a viscous fluid 9 interposed between the cage 4 and the stationary-side member 7. The viscous fluid 9 is, for example, a viscous fluid, such as a silicone oil, for applying rotational resistance to the cage 4.

Rotational torque of a motor (not shown) is transmitted to the outer ring 1 through, for example, worm gear gearing 6. As shown in FIG. 24(a), a plurality of cam faces 1b are provided on the internal periphery of the inner ring 1 at equal spacing in a circumferential direction. Also, wedge gaps, symmetrical in both positive and negative rotation directions, are formed between the cam faces 1b and the external periphery of the inner ring 2. The torque transmission members 3 are, as shown in FIG. 24(a), cylindrically shaped rollers arranged in the wedge gaps, and received and retained in pockets 4a of the cage 4. As shown in FIG. 24(b), the centering spring 5 is coupled to the end faces of both the cage 4 and the outer ring 1, enabling the cage 4 to co-rotate with the outer ring 1. Further, the centering spring 5 serves to position the cage 4 so that the individual torque transmission members 3 are placed at the centers of the corresponding individual cam faces 1b of the outer ring 1. The rotation of the cage 4 with respect to the stationary-side member 7 causes the viscous fluid 9 to apply viscous shearing resistance to the cage 4, resulting in delay in rotation of the cage 4 with respect to the outer ring 1.

In this way, when positive or negative rotational torque is applied from the outer ring 1, as shown in FIG. 25(b), viscous shearing resistance of the viscous fluid 9 causes the cage 4 to delay in rotation with respect to the outer ring 1. As a result, the torque transmission member 3 is engaged with the corresponding wedge gap between the outer ring 1 and the inner ring 2. Consequently, rotational torque applied to the outer ring 1 is transmitted to the inner ring 2 through the torque transmission members 3. Contrary to this, when positive or negative rotational torque (reverse input torque) is applied from the inner ring 2 in reverse to the above, as shown in FIG. 25(a), the cage 4 is aligned to the outer ring 1 by the centering spring 5. This way the torque transmission member 3 is positioned at a center c1 in the circumferential direction of the cam faces 1b. In this case, the individual torque transmission members 3 are disengaged from their corresponding individual wedge gaps to be in a state where the members are uncoupled from both the inner ring 2 and the outer ring 1. Therefore, the reverse input torque applied to the inner ring 2 is not transmitted to the outer ring 1, and torque transmission is thus shut off.

As described above, the clutch shown in FIG. 23 to FIGS. 25(a) and 25(b) is constituted in such a way that viscous shearing resistance of the viscous fluid 9 interposed between the cage 4 and the stationary-side member 7 causes the cage 4 to delay in rotation with respect to the outer ring 1. In this constitution, the following problem is feared.

(1) As shown in FIG. 26, viscous shearing resistance (K2) of the viscous fluid 9 increases in proportion to the rotational speed (rotational angular speed) of the outer ring 1. Further, when the rotational speed of the outer ring 1 reaches a predetermined value and the viscous shearing resistance (K2) is at a torque (K1) at which the centering spring 5 is deformed by a specific amount, the torque transmission members 3 start to engage with the outer ring 1 and the inner ring 2. Then, rotational torque applied to the outer ring 1 is transmitted to the inner ring 2 through the torque transmission members 3.

Accordingly, in the clutch described above, the outer ring 1 is required to rotate at a speed equal to or higher than a specific rotational speed (rotational speed at which the engagement starts) to switch the state of the clutch to a torque transmission state. For this reason, the clutch requires a specific length of time after the rotation drive source starts to rotate until the inner ring starts to rotate, creating a problem of start-up response.

(2) The viscosity of the viscous fluid 9 varies depending on temperature, so that a rotational speed at which the engagement starts may change depending on ambient temperature of use.

(3) The viscous fluid 9 may deteriorate initially given functions of the clutch in long-term use even if the fluid is sealed with seals (such as lip seals or labyrinth seals). This is because friction force at the sealing portions may fluctuate to cause changes in rotational resistance of the seals against the cage or leakage of the viscous fluid.

SUMMARY OF THE INVENTION

It is therefore an object-of the invention to provide a novel type of clutch that does not use a viscous fluid as rotational resistance applying means for applying rotational resistance to a cage.

A reverse-input shutoff clutch according to the invention comprises an input-side rotation member, an output-side rotation member, a torque transmission member that can be engaged with and disengaged from the input-side rotation member and the output-side rotation member in both positive and negative rotation directions, a cage for retaining the torque transmission member and switching between the engagement and disengagement of the torque transmission member through the rotation of the cage relative to the input-side rotation member, a stationary-side member, and rotational resistance applying means for causing friction resistance to act on the cage against its rotation with respect to the stationary-side member. In this constitution, torque transmission is controlled in the following way by the control of a rotational phase difference between the input-side rotation member and the cage. That is, positive and negative rotational torque from the input-side rotation member is transmitted to the output-side rotation member by the engagement of the torque transmission member with the input-side and output-side rotation members, while the transmission of positive and negative rotational torque from the output-side rotation member to the input-side rotation member is shut off by the disengagement of the torque transmission member.

In the constitution described above, the input-side rotation member and the output-side rotation member may be opposed each other in a radial direction of coaxial rotation shafts or may be opposed each other in an axial direction of coaxial shafts. The "input-side rotation member" is a member that is rotated by input torque applied from a rotation drive source. Also, the "output-side rotation member" is a member that can co-rotate with the input-side rotation member through the engagement and disengagement actions of the torque transmission member and also can freely rotate against the input-side rotation member.

The input torque applied to the input-side rotation member is transmitted to the cage. The cage is then rotated with respect to the stationary-side member. As a consequence, friction resistance from the rotation resistance applying means is applied to the cage, and the friction resistance causes the cage to have a rotation phase difference with respect to the input-side rotation member. Thus, the torque transmission member is engaged with the input-side and output-side rotation members, and the input torque is transmitted from the input-side rotation member to the output-side rotation member. On the other hand, rotational torque reversely applied to the output-side rotation member does not cause friction force of the rotational resistance applying means to act. Taking advantage of this, the cage and the input-side rotation member are made to rotate with respect to each other to cancel the rotational phase difference between them. In this way, the torque transmission member is centered and disengaged (released from the engaged state) from both the rotation members so that torque transmission to the input-side rotation member can be shut off. The function described above can be secured by, for example, elastically connecting the input-side rotation member and the cage in rotation directions (for example, by connecting them in both positive and negative directions through an elastic member).

Engagement and disengagement actions of the torque transmission member against the input-side rotation member and the output-side rotation member can be realized as an example described below. That is, wedge gaps are formed between the input-side rotation member and the output-side rotation member, and an engagement element as the torque transmission member is wedge-engaged with or disengaged from the wedge gaps. This constitution includes a constitution where cam faces for forming the wedge gaps are provided at the output-side rotation member or the input-side rotation member (where the element with a circular cross section such as a roller or a ball is used as the engagement element) as well as a constitution where cam faces for forming wedge gaps are provided at the engagement element (element such as a sprag is used as the engagement element). The input-side rotation member or the output-side rotation member, having cam faces, are obtainable by directly providing the cam faces on a shaft-shaped member or by fixing a ring-shaped member having cam faces on the shaft-shaped member.

In this clutch, the rotational friction applying means for applying friction resistance (sliding friction resistance, for example) to the cage is provided. Accordingly, rotational resistance acting on the cage is independent of rotation speed. This provides the clutch with excellent spin-up response. Therefore, the clutch can also be used, for example, for applications where it is required that rotational torque applied to an input-side rotation member be instantly transmitted to an output-side rotation member.

Further, rotational resistance acting on the cage is not affected by temperature, so that operation characteristics of the clutch vary little with changes in ambient temperature.

Also, the reverse-input shutoff clutch is characterized in that it allows the output-side rotation member to freely rotate against positive and negative rotational torque applied from the output side. Allowing the output-side rotation member to freely rotate enables, for example, manual operation of an object (such as a door or a wheel) to be driven.

This reverse-input shutoff clutch is characterized in that the rotational resistance applying means is a sliding member arranged so that it can be coupled in a circumferential direction to either of the cage and the stationary-side member and can slide against the other. In this reverse-input shutoff clutch, it is arranged in such a way that the sliding member slides, with itself being coupled to the cage in a circumferential directions, against the stationary-side member.

This reverse-input shutoff clutch is characterized in that the sliding member is a sliding spring having a sliding portion mounted on the stationary-side member, and a coupling portion which extends in a radial direction and can be coupled to the cage in a circumferential direction.

This reverse-input shutoff clutch is characterized in that the sliding member is provided with an annular ring that can be coupled to the cage in a circumferential direction and an elastic member interposed between the annular ring and the stationary-side member.

The rotation drive device according to the invention is characterized in that it has a rotation drive source, a speed reduction mechanism portion for reducing rotation torque applied from the rotation drive source, and the reverse-input shutoff clutch according to either of claim 1 or claim 6.

A typical device as the "rotation drive source" includes a motor (a hydraulic motor and pneumatic motor are also included besides an electric motor) and an internal combustion engine. The "rotation drive source" in this invention, however, includes every kind of equipment that generates rotational force by power such as electric, hydraulic, or pneumatic power, and further includes mechanisms that generate rotational force by manual operation. Further, the constitution of the "speed reduction mechanism portion" is not limited to any specific one, and includes constitutions formed with a gear mechanism, a worm and wheel mechanism, planetary roller mechanism, cone disc mechanism, or the like. The rotation drive device is further provided with a housing for accommodating the speed reduction mechanism portion and the reverse-input shutoff clutch.

Further, a fully automatic washing machine according to the invention has a wash drum for washing and spin-drying; a wash-drum shaft for rotating the wash drum; a pulsator arranged within the wash drum; a drive power source; a pulsator shaft for rotating the pulsator by input torque applied from the drive power source; and a clutch, arranged between the wash-drum shaft and the pulsator shaft, for controlling the transmission and shutoff of torque that is to be applied to the wash drum. In the constitution above, the clutch is a reverse-input shutoff clutch that comprises an input-side rotation member connected to the pulsator shaft; an output-side rotation member connected to the wash-drum shaft; a torque transmission member that is interposed between the input-side rotation member and the output-side rotation member and is switchblade between an engagement state for engaging the input-side rotation member and the output-side rotation member and a disengagement state for disengaging both the members; a cage for retaining the torque transmission member and switching between the engagement and disengagement states of the torque transmission member in accordance with a rotational phase difference between the torque transmission member and the input-side rotation member; and rotational resistance applying means for applying rotational resistance through frictional resistance, which occurs when the rotational resistance applying means contacts with a stationary side member, to the cage. The reverse-input shutoff clutch works such that, against rotational torque from the input-side rotation member, the clutch sets the torque transmission member at the engagement state by a rotational phase difference generated by the application of rotational resistance to the cage between the cage and the input-side rotation member, and, against reverse input torque from the outside-side member, the clutch cancels the rotational resistance applied to the cage to eliminate the rotational phase difference so as to set the torque transmission member at the disengagement state.

The "input-side rotation member," having a clutch face to which and from which the torque transmission member is engaged and disengaged, is directly or indirectly connected to the pulsator shaft. The "output-side rotation member," having a clutch face to which and from which the torque transmission member is engaged and disengaged, is directly or indirectly connected to the wash-drum shaft. The output-side rotation member is, through the engagement and disengagement actions of the torque transmission member, rotated together with the input-side rotation member and is freely rotated against the input-side rotation member. Further, the "stationary-side member" is a member that belongs to a stationary system of which rotation is restricted. The stationary-side member is not necessarily always in a stationary state, and also includes such a member of which-rotation is restricted so that it becomes a stationary-side member when required and of which rotation is allowed in other cases so that it then becomes a rotation-side member.

According to the constitution described above, input torque applied to the input-side rotation member is transmitted to the cage. Since the cage is rotated against the stationary-side member by the torque applied, frictional resistance from the rotation resistance applying means acts on the cage. The frictional resistance then causes the cage to have a rotational phase difference against the input-side rotation member. As a result, the torque transmission member is in an engagement state so that the input torque is transmitted from the input-side rotation member to the output-side rotation member. Thus, both the pulsator shaft and the wash-drum shaft can be rotated in spin-drying and the like.

On the other hand, when rotational torque is applied in reverse to the output-side rotation member through the wash-drum shaft, friction force induced by the rotational torque applying means does not act on the cage. The torque transmission member is centered to be in a disengagement state when the cage and the input-side rotation member are relatively rotated each other by making use of the characteristic described above so that a rotational phase difference is cancelled. In this way, the transmission of torque from the output-side rotation member (a wash drum-side member) to the input-side rotation member (a pulsator-side member) can be shut off. Accordingly, for washing for example, the wash-drum shaft can be freely rotated in forward and reverse directions so that the wash drum can be rotated by drive force of water streams caused by the rotation of the pulsator. This causes relative rotation between the pulsator and the wash drum that is rotated with inertia in a direction toward which the wash drum was rotated before the rotation direction of the pulsator is switched, and thereby wash capability is enhanced. Further, enhanced wash capability provides an advantage such as shortened wash time which reduces power consumption.

In order to realize the function described above, the cage having a rotational phase difference against the input-side rotation member is required to be rotated to a direction in which the rotational phase difference is cancelled. This can be achieved when a spring element such as a centering spring, for example, is used to connect elastically in a rotation direction the input-side rotation member and the cage.

The engagement and disengagement actions of the torque transmission member can be realized respectively, for example, by the wedging engagement and disengagement of a coupling member as the torque transmission member in or from a wedge gap that is formed between the input-side rotation member and the output-side rotation member. This constitution includes a constitution where a cam face that forms the wedge gap is provided at the input-side rotation member or at the output-side rotation member (in this constitution, a member having a circular cross section, such as a roller or a ball, is used as the coupling member) and a constitution where a cam face that forms the wedge gap is provided at the coupling member (a member such as a sprag is used as the coupling member in this constitution). An input-side rotation member or output-side rotation member, having a cam face, is obtainable by providing the cam face directly on a shaft-shaped element or by fixing a ring-shaped element having the cam face to a shaft-shaped element.

This reverse-input shutoff clutch is provided with the rotational resistance applying means that applies rotational resistance, induced by frictional resistance (sliding frictional resistance, for example), to the cage. Accordingly, rotational resistance that acts on the cage is independent of rotational speed. This fact provides the reverse-input shutoff clutch an advantage of being excellent in start-up response. Therefore, in a fully automatic washing machine, rotational torque applied to the input-side rotation member (pulsator shaft) can be. instantly transmitted to the output-side rotation member (wash-drum shaft). Further, rotational resistance acting on the cage is not affected by temperature; therefore, it is also a feature of the clutch whose dynamic characteristics rarely vary in the changes in ambient temperature.

This reverse-input shutoff clutch can be constituted such that it can be switched between an operation state where input torque is transmitted from the input-side rotation member to the output-side rotation member and a non-operation state where the transmission of input torque from the output-side rotation member to the input-side rotation member is shut off. In such a constitution, the transmission of torque from the input-side rotation member to the output-side rotation member is shut off when the reverse-input shutoff clutch is set at the non-operation state, so that the wash-drum shaft can be freely rotated as described above. While, when the reverse-input shutoff clutch is switched at the operation state for spin-drying, rotational torque from the input-side rotation member is transmitted to the output-side rotation member; therefore both the pulsator shaft and the wash-drum shaft can be rotated.

Switching of the reverse-input shutoff clutch between the operation and non-operation states described above can also be made by switching the rotational resistance applying means between its contact and non-contact states against a stationary-side member. That is, when the rotational resistance applying means is contacted with a stationary-side member, frictional resistance generated through the contact applies rotational resistance to the cage. The torque transmission member can be thus set at the engagement state. On the other hand, when the rotational resistance applying means is brought to a non-contact state against a stationary-side member, frictional resistance is removed to reduce rotational resistance applied to the cage. The torque transmission member can be thus brought to the disengagement state. For example, when a control member, provided at the reverse-input shutoff clutch, is restricted for rotation, the control member becomes the stationary-side member described above. Thus, through the contact of the control member with the rotational resistance applying means, the reverse-input shutoff clutch can be in the operation state. While, when the control member is removed of the rotational restriction, the control member starts to rotate (the control member is not the stationary-side member in this case). Since the rotational resistance applying means is thus in the non-contact state against the stationary-side member, rotational resistance that is applied to the cage becomes smaller, and the reverse-input shutoff clutch is in the non-operation state.

BRIEF DESCRIPTION OF THE DRAWINGS

FIG. 24(a) is a cross-sectional view, taken along the line B—B in FIG. 23, showing a cross section of a portion where rollers are provided;

FIG. 24(b) is a cross-sectional view, taken along the line C—C in FIG. 23, showing a cross section of a portion where a centering spring is provided;

DETAILED DESCRIPTION OF THE PREFERRED EMBODIMENTS

Preferred embodiments of the invention will be described below referring to the attached drawings.

Figure 1:
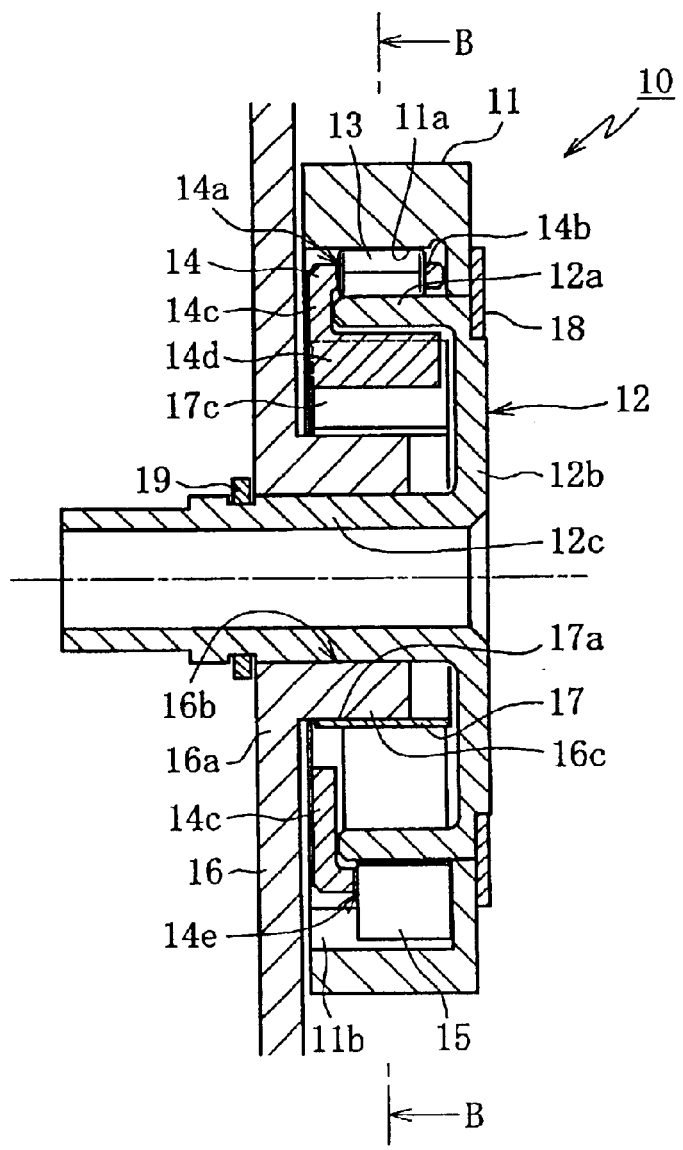
FIG. 1 is a cross-sectional view, taken along the line A—A in FIG. 2, of a reverse-input shutoff clutch of an outer-ring input type according an embodiment of the invention.
Figure 2:
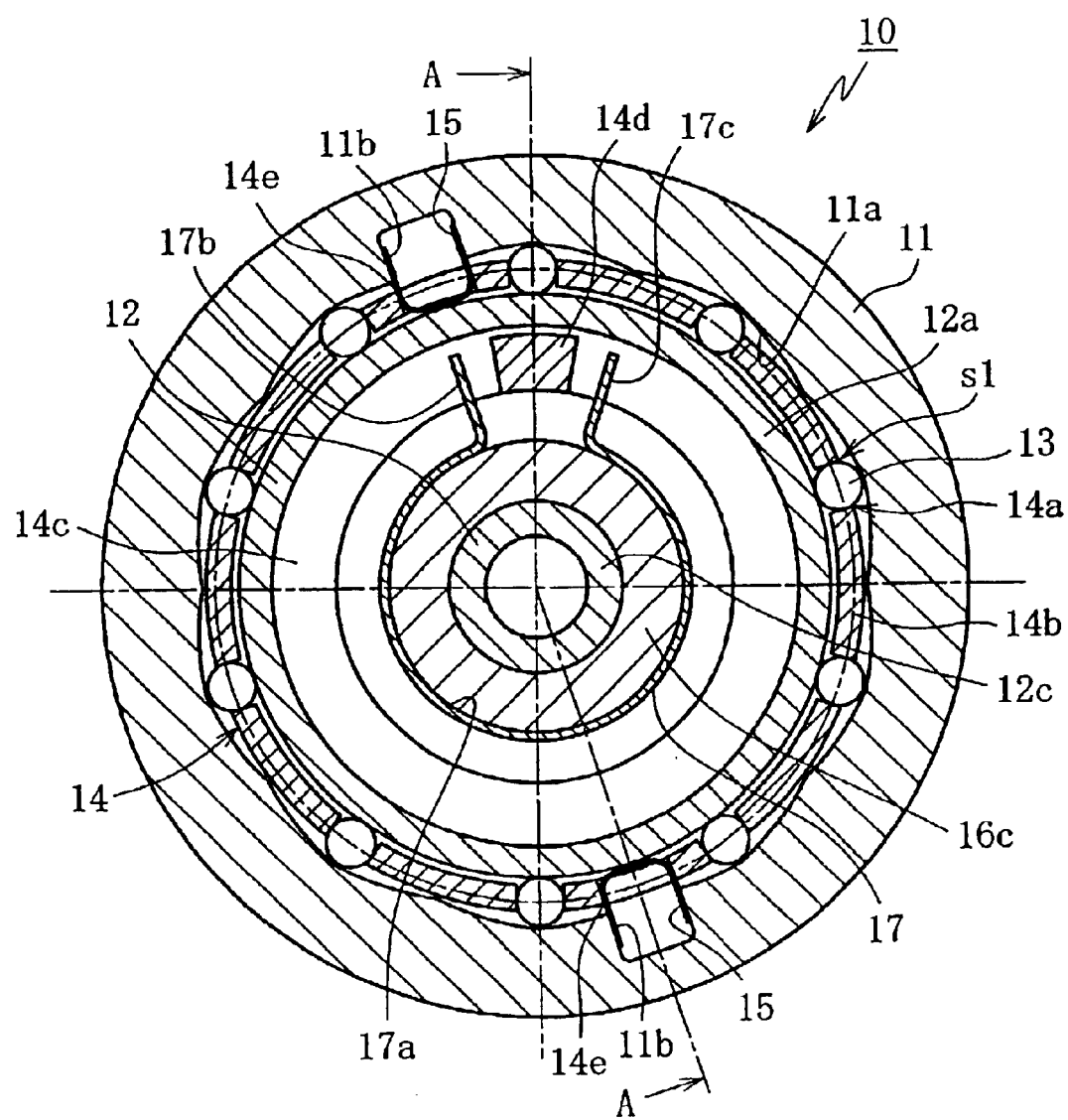
FIG. 2 is a cross-sectional view, taken along the line B—B in FIG. 1, of the reverse-input shutoff clutch of an outer-ring input type according the embodiment of the invention.

FIGS. 1 and 2 show a reverse-input shutoff clutch 10 of an outer-ring input type according to a first embodiment of the invention.

The clutch 10 is provided with an input inner ring 11 as an input-side rotation member, an output inner ring 12 as an output-side rotation member, rollers 13 as a torque transmission member, a cage 14 for retaining the rollers 13, a centering spring 15 as an elastic member for positioning the cage 14, a housing 16 as a stationary-side member, and a sliding spring 17 as rotational resistance applying means for causing slide friction resistance to act on the cage against the rotation of the cage 14.

The input outer ring 11 is connected, either directly or indirectly through power transmission means such as chain, to a drive portion (not shown; constituted with, for example, an electric motor and a speed reduction mechanism).

The output inner ring 12 is, as shown in FIG. 1, arranged at the inside diameter side of the input outer ring 11. Also, the output inner ring 12 is provided with a hollow cylinder portion 12a opposing the inner periphery of the input outer ring 11, a flange portion 12b extending from an end of the hollow cylinder portion 12a toward the rotation center, and a hollow shaft portion 12c extending from the flange portion 12b along the rotation shaft. A washer installation portion is formed on the end face at the outer periphery side of the flange portion 12b of the output inner ring 12. Also, a washer 18 is installed at the washer installation portion in such a way that it straddles the flange portion 12b and the input outer ring 11, thereby preventing the input outer ring 11 from coming out of position. As shown in FIG. 2, on the inner periphery of the input outer ring 11, there are formed at equal spacing in a circumferential direction a plurality (with the number same as that of the rollers 13) of cam faces 11a between the inner periphery of the input outer ring 11 and the outer periphery of the hollow cylinder portion 12a of the output inner ring 12. The cam faces 11a form wedge gaps s1 that symmetrically reduce their gaps toward both positive and negative rotation directions. The dimension of the wedge gap s1 in a radial direction at the centers c1 in a circumferential direction is larger than the diameter of the rollers 13. Also, the wedge gap s1 symmetrically reduces from the center c1 in a circumferential direction toward both positive and negative rotation directions. When the roller 13 is at the center c1 in a circumferential direction of the wedge gap s1, the roller 13 can rotate on its own axis within the wedge gap s1. At this time, because the input outer ring 11 and the output inner ring 12 are not engaged with respect to each other in a rotation direction, rotational torque reversely applied to the output inner ring 12 is not transmitted to the input outer ring 11 and shut off. When the rollers 13 move in a circumferential direction from the centers c1 of the wedge gaps s1 to either a positive or negative rotation direction and are engaged with reduced parts of the wedge gaps s1, the input outer ring 11 and the output inner ring 12 are coupled to each other through the rollers 13. As a result, rotational torque from the input outer ring 11 is transmitted to the output inner ring 12 through the rollers 13. Further, as FIGS. 1 and 2 show, a centering spring installation portion 11b for installing a centering spring 15 is formed in an axial direction at the inner periphery of the input outer ring 11.

With the rollers 13 being retained in pockets 14a formed at equal spacing in a circumferential direction, the cage 14 is provided with retaining portions 14b arranged between the inner periphery of the input outer ring 11 and the hollow cylinder portion 12a of the output inner ring 12, a flange portion 14c extending, at the side axially opposing the flange portion 12b of the output inner ring 12, from the retaining portion 14b toward the inside diameter side of the cage 14, and a projection portion 14d projecting in an axial direction, at the inner side of the hollow cylinder portion 12a of the output inner ring 12, from the flange portion 14c. A centering spring installation portion 14e for installing the centering spring 15 is formed at the retaining portion 14b of the cage 14.

The centering spring 15 is, as FIG. 2 shows, an elastic member of a substantially U-shaped cross section, the bottom portion of the U-shape is fitted into the centering spring installation portion 14e of the cage 14, and the upper ends of the U-shape are coupled to the centering spring installation portion 11b of the input outer ring 11. The centering spring 15 serves to elastically connect the cage 14 and the input outer ring 11 to each other. It also serves to position (to center) the cage 14 with respect to the input outer ring 11 so that the individual rollers 13 received in the cage 14 are positioned at the centers c1 in a circumferential direction of the corresponding individual wedge gaps s1. FIG. 2 shows a state where the cage 14 is centered by the centering spring 15. In this state, the individual centers in a circumferential direction of the pockets 14a of the cage 14 and the individual centers in a circumferential direction of the cam faces 11a of the input outer ring 11 agree in position with each other. It means the individual rollers 13 are positioned at the centers c1 in a circumferential direction of the corresponding individual wedge gaps s1.

The rollers 13 and the centering spring 15 are, with the both being assembled into the pockets 14a of the cage 14 and the centering spring installation portion 14e, inserted as an assembly into between the input outer ring 11 and the output inner ring 12. At this time, the rollers 13 are inserted into between the cam faces 11a formed on the inner periphery of the input outer ring 11 and the outer periphery of the hollow cylinder portion 12a of the output inner ring 12. Also, the centering spring 15 is inserted into the centering spring installation portion 11b of the input outer ring 11.

The housing 16 is a stationary-side member (a member which does not rotate) belonging to the stationary system, and is provided with a radial direction portion 16a positioned at one side in an axial direction of the clutch 10 and a boss portion 16c extending from the inner periphery of the radial direction portion 16a toward the other side in an axial direction of the clutch 10. The inner periphery of the boss portion 16c is a shaft boss 16b that is fitted onto the shaft portion 12c of the output inner ring 12. The outer periphery of the boss portion 16c opposes, with a clearance in a radial direction in between, the inner periphery of the hollow cylinder portion 12a of the output inner ring 12. Further, a continuous space is formed in a circumferential direction between the outer periphery of the boss portion 16c and the hollow cylinder portion 12a of the output inner ring 12. The projection portion 14d of the cage 14 described above projects into the space continuing in a circumferential direction, and rotates in the continuous space as the cage 14 rotates.

The sliding spring 17 is, as shown in FIG. 2, an elastic member of a ring shape having ends capable of being fitted onto the boss portion 16c of the housing 16. Also, the sliding spring 17 is provided with a sliding portion 17a being fitted onto the boss portion 16c and sliding on the boss portion 16c, and coupling pieces 17b and 17c bent at both ends of the sliding portion toward the outside diameter side. The sliding spring 17 is fitted in advance onto the boss portion 16c of the housing 16 and assembled into the clutch 10 at the time when the shaft portion 12c of the output inner ring 12 is inserted into the shaft boss 16b of the housing 16. At this time, the coupling pieces 17b and 17c of the sliding spring 17 are arranged with clearances at both sides in a circumferential direction of the projection portion 14d of the cage 14, so that both the coupling pieces respectively couple in a circumferential direction to the projection portion 14d of the cage 14.

Reference numeral 19 in FIG. 1 is a retaining ring fitted in a groove formed on the outer periphery of the shaft portion 12c of the output inner ring 12. The retaining ring prevents the shaft portion 12c of the output inner ring 12 from falling out of the shaft boss 16b of the housing 16.

Figure 4:
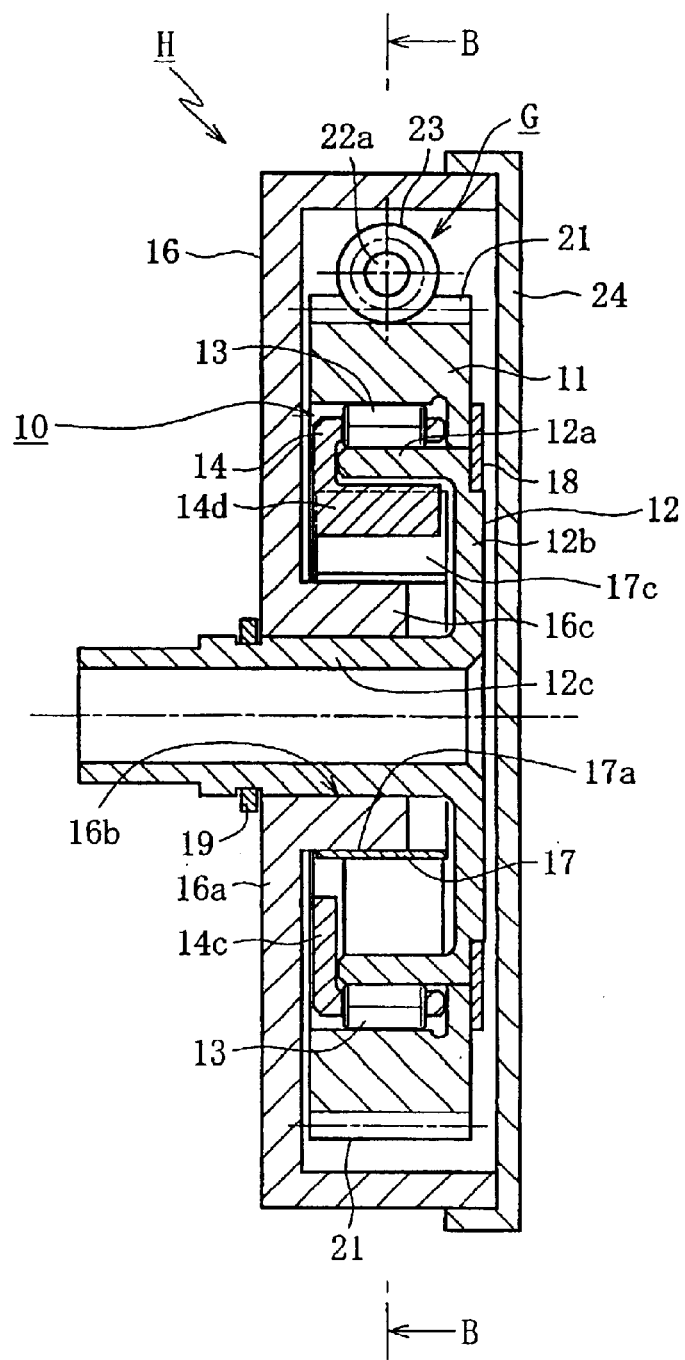
FIG. 4 is a cross-sectional view, taken along the line A—A in FIG. 5, of a rotation drive device assembled with a reverse-input shutoff clutch of an outer-ring input type according an embodiment of the invention.
Figure 5:
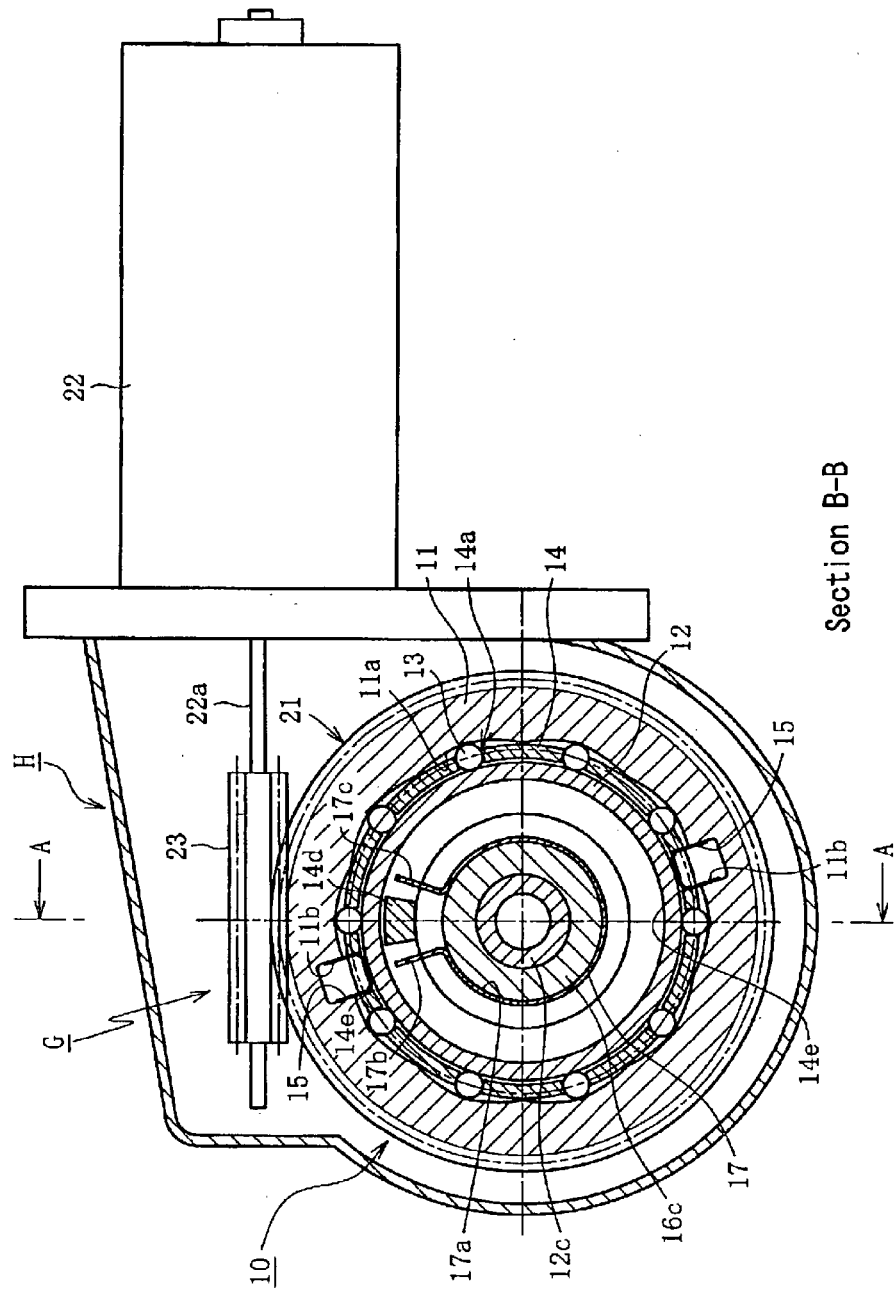
FIG. 5 is a cross-sectional view, taken along the line B—B in FIG. 4, of the rotation drive device assembled with the reverse-input shutoff clutch of an outer-ring input type according the embodiment of the invention.

FIGS. 4 and 5 show the constitution of a rotation drive device H. As the figures show, the clutch 10 is received in the housing 16 together with a speed reduction mechanism portion G, and rotational torque of a motor 22 as a rotation drive source is applied to the input outer ring 11.

Adopted in this embodiment as the speed reduction mechanism portion G is a worm and wheel mechanism, which is constituted with a worm wheel 21 formed on the outer periphery of the input outer ring 11 and a worm shaft 23 formed on a drive shaft 22a of an electric motor 22. In this case, the worm wheel 21 may be directly formed on the input outer ring 11 or constituted as a separate member that is fixed to the input outer ring 11. Reference numeral 24 in FIG. 4 is a cover body fixed to the housing 16 so as to cover the clutch 10, and mainly serves to prevent foreign matters from entering into the clutch 10.

The clutch 10 transmits rotational torque applied to the input outer ring 11 to the output inner ring 12, and it also works as a reverse-input shutoff clutch for shutting off rotational torque reversely applied to the output inner ring 12. More specifically, when rotational torque is applied to the input outer ring 11, the sliding spring 17 applies rotational resistance induced by slide friction resistance to the cage 14. This causes the centering spring 15 to elastically deform to give a rotational phase difference (to a direction of rotational delay) to the cage 14. In this state where the cage 14 has the rotational delay, the rollers 13 are engaged with the wedge gaps s1 and rotational torque applied to the input outer ring 11 is transmitted to the output inner ring 12 through the rollers 13. On the other hand, slide friction resistance of the sliding spring 17 is not generated against rotational torque reversely applied from the output inner ring 12. Consequently, the centering spring 15 acts on the cage 14 to center it, thereby canceling a rotational phase difference between the cage 14 and the input outer ring 11. In this state where the cage 14 is being centered, the rollers 13 are positioned at the centers c1 in a circumferential direction of the wedge gaps s1 and they can rotate on their own axes. Therefore, the output inner ring 12 freely rotates against rotational torque reversely applied from the output side, and thus the reverse input torque is shutoff against the input outer ring 11.

Described below is the action of the sliding spring 17 that gives rotational resistance to the cage 14 when rotational torque is applied to the input outer ring 11.

Figure 3:
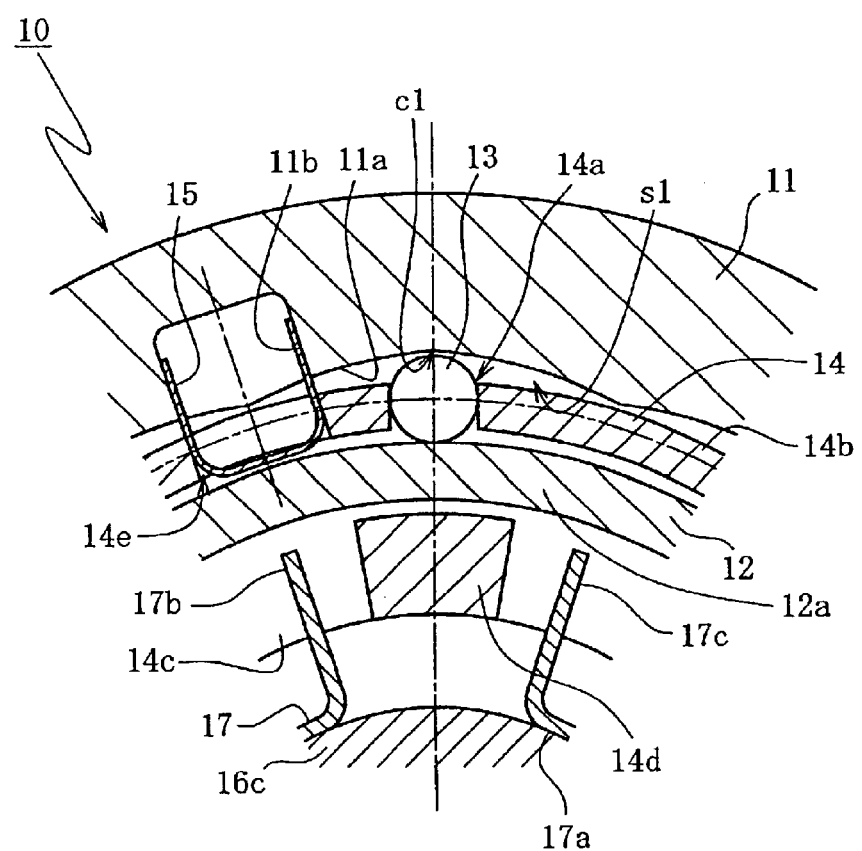
FIG. 3 is a cross-sectional view showing an initial stage of the reverse-input shutoff clutch of an outer-ring input type according the embodiment of the invention.

(1) In an initial state where rotational torque is not yet applied to the input inner ring 11 the cage 14 is , as shown in FIG. 3, centered by the centering spring 15. Accordingly, the roller 13 received in the pocket 14a of the cage 14 is positioned at the center c1 in a circumferential direction of the wedge gap s1 between the cam face 11a of the input outer ring 11 and the hollow cylinder portion 12a of the output inner ring 12.

(2) When rotational torque of, for example, a clockwise direction as indicated in FIG. 3 is applied, the cage 14 starts to rotate together with the input outer ring 11. This is because the cage 14 is connected to the input outer ring 11 through the centering spring 15. After rotating a specific angle, the cage 14 reaches a state where the projection portion 14d of the cage 14 contacts the coupling piece 17c of the sliding spring 17 at the forward side in a rotation direction of the cage 14, or at the right-hand side of the figure.

Figure 6:
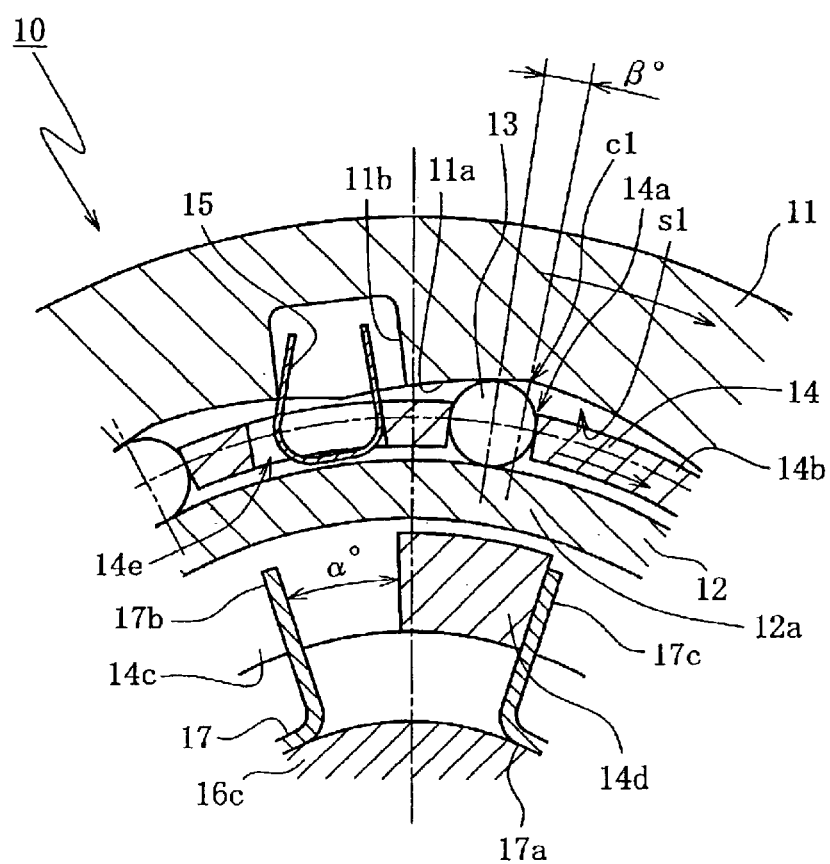
FIG. 6 is a cross-sectional view of the reverse-input shutoff clutch of an outer-ring input type according to an embodiment of the invention, showing a state where torque is being transmitted.
Figure 7:
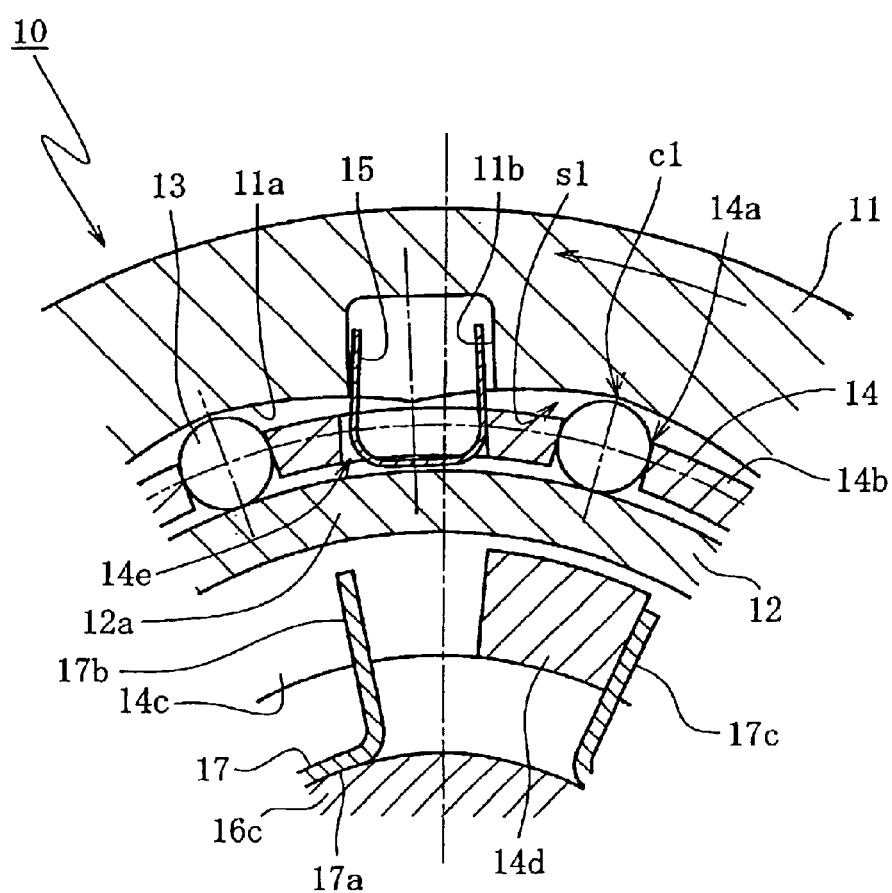
FIG. 7 is a cross-sectional view showing a state where the engagement of rollers in the reverse-input shutoff clutch of an outer-ring input type according an embodiment of the invention is being released.

(3) When the input outer ring 11 further rotates, as shown in FIG. 6, the sliding spring 17 co-rotates, with the projection portion 14d of the cage 14 being in contact with the coupling piece 17c of the sliding spring 17. As the sliding spring 17 rotates in a sliding manner on the boss portion 16c of the housing 16, it is subjected to slide friction resistance. This slide friction resistance is transmitted from the coupling piece 17c to the projection portion 14d of the cage 14 and becomes rotational resistance of the cage 14. On the other hand, rotational resistance (torque) of the cage 14 caused by the slide friction resistance of the sliding spring 17 is larger than elastic force (spring torque) of the centering spring 15. Consequently, the centering spring 15 is elastically deformed, and the cage 14 delays in rotation with respect to the input outer ring 11 by an extent corresponding to a degree of the deformation.

(4) The rotational delay of the cage 14 caused by the elastic deformation of the centering spring 15 causes the roller 13 retained in the pocket 14a to be engaged with the wedge gap s1 between the cam face of the input outer ring 11 and the outer periphery of the hollow cylinder portion 12a of the output inner ring 12. This causes rotational torque applied to the input outer ring 11 to be transmitted to the output inner ring 12 through the rollers 13.

This is how rotational torque applied to the input outer ring 11 is transmitted to the output inner ring 12 through the rollers 13. Also, additionally, when the input outer ring 11 stops to rotate, the rollers 13 are disengaged from the wedge gaps s1 by restoring force of the centering spring 15 and centered at the centers c1 in a circumferential direction of the wedge gaps s1.

It may happen that the rollers 13 are kept engaged with the wedge gaps s1 even if the input outer ring 11 has stopped to rotate. This occurs when, for example, engaging force (residual torque) acting on the rollers 13 is larger than restoring force of the centering spring 15.

If this occurs; the rollers 13 can be disengaged from the wedge gaps s1 in the following way. That is, rotational torque in a counterclockwise direction (direction opposite to that of the applied rotational torque) is applied (with reverse rotation means arranged) to the input outer ring 11. Then, the input outer ring 11 is moved in a counterclockwise direction (by being rotated in the reverse direction) with respect to the cage 14, and thus the rollers 13 can be disengaged from the wedge gaps s1. Once this has been done, the cage 14 is centered by restoring force of the centering spring 15, and the rollers 13 move to the centers c1 in a circumferential direction of the wedge gaps s1. Thus the clutch 10 is in the initial state shown in FIG. 3.

What is described above is a case where rotational torque in a clockwise direction is applied to the input outer ring 11; however, the same actions and functions as described above are applicable to a case where rotational torque in a counterclockwise direction is applied.

The response of the reverse-input shutoff clutch 10 above will now be described referring to FIG. 8. In the reverse-input shutoff clutch 10, as FIG. 6 shows, when the input outer ring 11 starts to rotate, the cage 14 connected to the input outer ring 11 through the centering spring 15 starts to co-rotate with the input outer ring 11. When the cage 14 has rotated a specific angle, the projection portion 14d of the cage 14 is in contact with the coupling piece 17c of the sliding spring 17 in the forward side in a rotation direction at the right-hand side of the figure. In the figure, the input outer ring 11 rotates α degrees at maximum until the projection portion 14d of the cage 14 and the coupling piece 17c of the sliding spring 17 are in contact with each other. It may occur that the projection portion 14d of the cage 14 and the coupling piece 17c of the sliding spring 17 are already in contact with each other in an initial state. In such a case, the rotation angle of the input outer ring 11 until the projection portion 14d of the cage 14 and the coupling piece 17c of the sliding spring 17 contact each other is 0 degree.

Next, when the centering spring 15 deflects to cause the cage 14 to delay in rotation with respect to the input outer ring 11, the roller 13 is engaged with the wedge gap s1. This causes the input outer ring 11 and the output inner ring 12 to be coupled to each other through the roller 13, and rotational torque applied to the input outer ring 11 is transmitted to the output inner ring 12 through the roller 13. At this time, the rotation angle of the input outer ring 11 is angle β (degrees) that is an angle from the center c1 in a circumferential direction of the wedge gap s1 until the roller 13 engages with the wedge gap s1.

Figure 8:
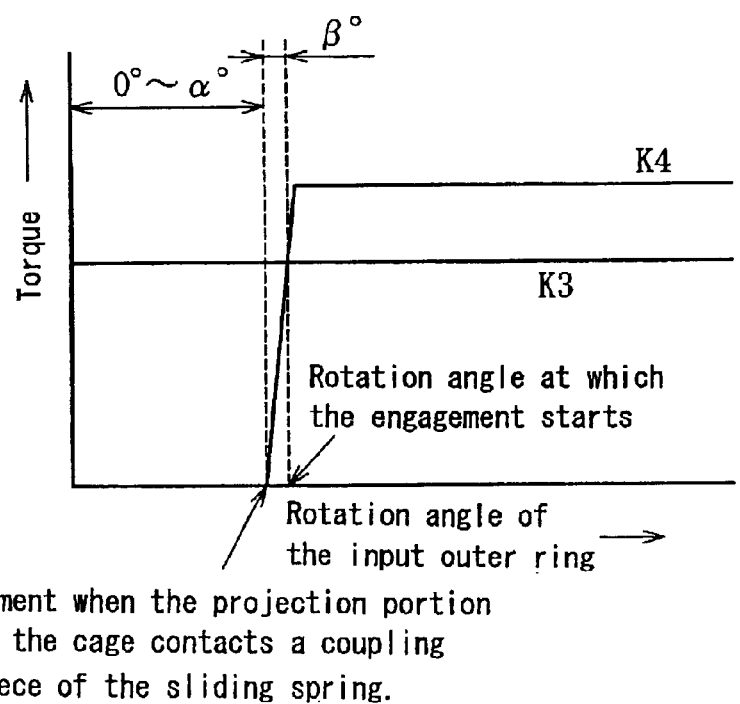
FIG. 8 is a diagram showing the relationship between spring torque K3 of a centering spring and slide friction resistance K4 of a sliding spring.

FIG. 8 is a diagram illustrating what has been described above. In the figure, the input outer ring 11 rotates by angles between 0 to α degrees after it starts to rotate until the projection portion 14d of the cage 14 contacts the coupling piece 17c of the sliding spring 17. In this angle range, rotational resistance does not act on the cage 14. When the centering spring 15 deflects to cause the cage 14 to have rotational delay of a specific angle and the magnitude of slide friction resistance (torque K4) acting on the cage 14 reaches a level of an elastic force (torque K3) of the centering spring 15 (rotation angle of β degrees), the roller 13 engages with the wedge gap s1 to transmit rotational torque to the output inner ring 12.

Accordingly, the rotation angle (switch angle) of the input outer ring 11 from the start of the rotation of the input outer ring 11 to the angle at which rotational torque is transmitted to the output inner ring 12 is between β and (β+α) degrees. In this case, the response of the clutch can be adjusted by adjusting the values of the angles α and β.

Slide friction resistance of the sliding spring 17 is thus independent of rotation speed as described above; therefore, the response of the clutch can be improved. Also, because slide friction resistance is not affected by changes in ambient temperature, the problem that clutch characteristics change depending on changes in temperature is almost eliminated.

The clutch 10 according to the first embodiment of the invention has been described above; however, the constitution of the clutch 10 is not limited to the above. For example, the sliding spring 17 for applying rotational resistance to the cage 14 is replaceable with the rotational resistance applying structure shown in FIGS. 9(a) and 9(b).

Figure 9:
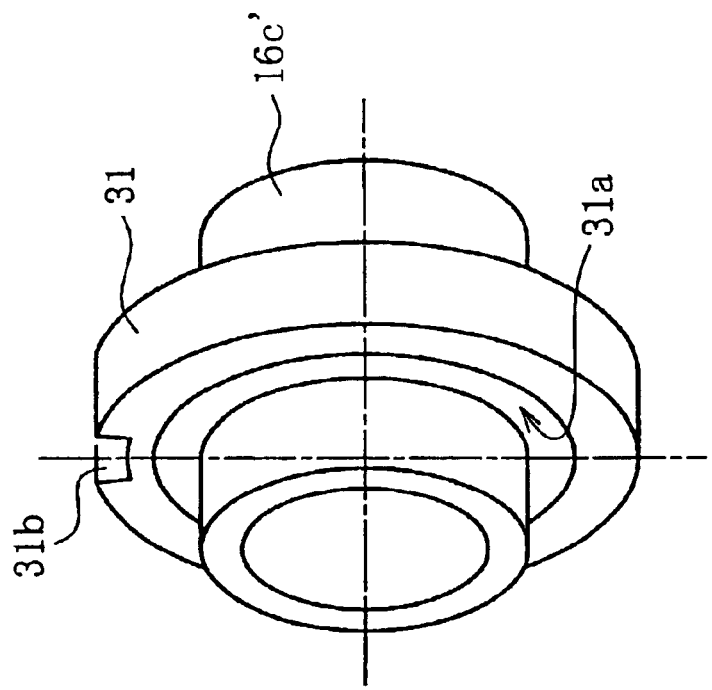
FIG. 9(a) is a cross-sectional view of a modified example of the reverse-input shutoff clutch of an outer-ring input type according an embodiment of the invention.
FIG. 9(b) is an external view of the clutch in FIG. 9(a)
Figure 9:
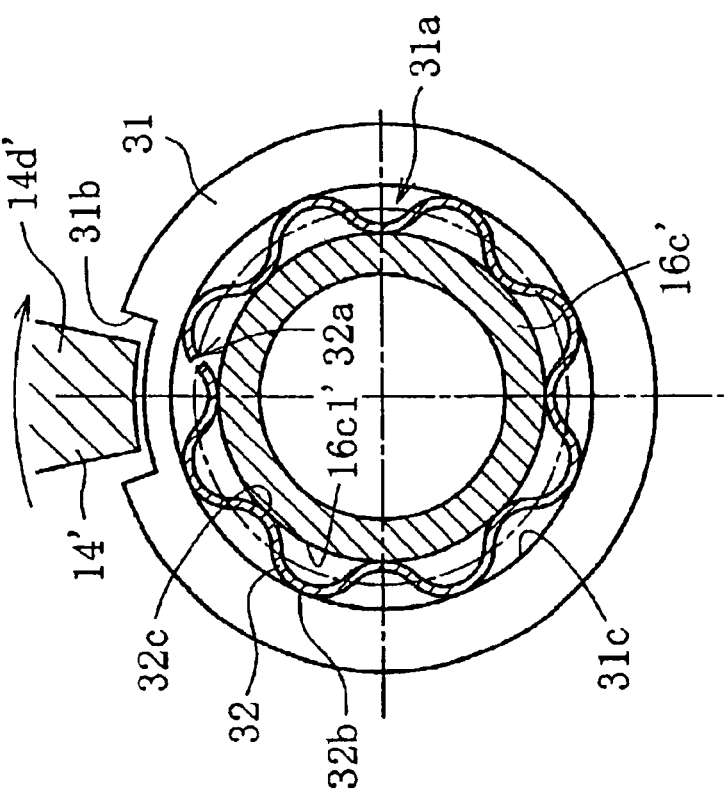

In FIG. 9(a), reference numeral 31 is an annular ring installed on an outer periphery 16c1' of a boss portion 16c' of a housing 16' with specific spacing in a radial direction being kept between the annular ring and the outer periphery 16c1'. Reference numeral 32 is a sliding spring as rotational resistance applying means arranged in a space 31a in such a way that it contacts both the boss portion 16c' and the annular ring 31. In this constitution, the space 31a continues in a rotation direction between the outer periphery of the boss portion 16c' of the housing 16' and the inner periphery of the annular ring 31. FIG. 9(b) shows an external view of the rotational resistance applying means.

As shown in FIG. 9(a), a groove-shaped coupling portion 31b is formed on the outer periphery of the annular ring 31. Also, a projection portion 14d' of the cage is received in the annular-shaped coupling portion 31b. By doing so, the coupling portion 31b and the projection portion 14d' of the cage are coupled to each other in both positive and negative rotation directions. Thus, the annular ring 31, actuated by the rotation of the cage, co-rotates. The sliding spring 32 is a ring member, having ends, made of a corrugated elastic member bent into an annular shape and split up at a portion 32a. Portions 32b rising toward the outside-diameter side of the outer periphery of the sliding spring 32 contacts the inner periphery 31c of the annular ring 31. Also, portions 32c falling toward the inside contact the outer periphery 16c1' of the boss portion 16c'.

In the constitution described above, when rotational torque is applied to the input outer ring (not shown), the cage co-rotates with the input outer ring by the connecting action of the centering spring. Further, the front face in a rotation direction of the projection portion 14d' of the cage contacts an end face of the coupling portion 31b of the annular ring 31. Thus rotational torque is applied to the annular ring 31 to cause it to co-rotate. When the annular ring 31 starts to be rotated by rotational torque applied to it, the sliding spring 32 contacting both the annular ring 31 and the boss portion 16c' is rotated while being subjected to slide friction resistance. The slide friction resistance of the sliding spring 32 becomes rotational resistance to the cage through the annular ring 31.

It is sufficient for the sliding spring 32 if it is such a member that contacts both the boss portion 16c' of the housing 16' and the annular ring 31, while being between them, to cause slide friction resistance to act on the annular ring 31. Consequently, the sliding spring 32 is not limited to the embodiment described above. For example, it may be an elastic member (such as a rubber member) interposed between the boss portion 16c' of the housing 16' and the annular ring 31 so as to contact both of them.

Next, a second embodiment of the invention will be described below, where the reverse-input shutoff clutch 10 of an inner ring input type is applied to an axle shaft portion of an electricity-assisted trolley.

Figure 10:
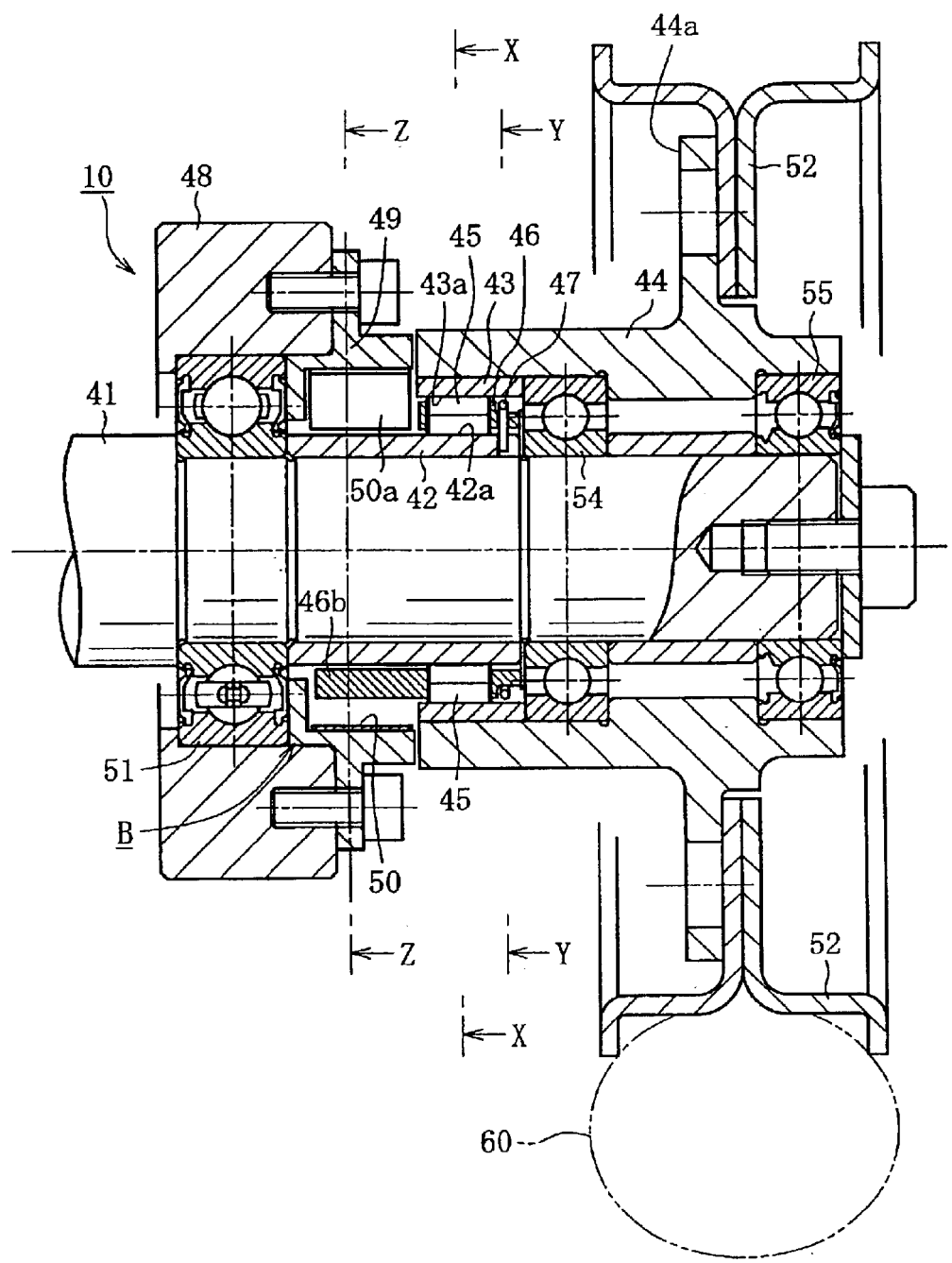
FIG. 10 is a cross-sectional view of an axle shaft portion of an electricity-assisted trolley using the reverse-input shutoff clutch of an inner ring input type according to an embodiment of the invention.

The clutch 10 is, as shown in FIG. 10, provided with a clutch inner ring 42 mounted on a axle shaft 41 as a an input-side rotation member, a clutch outer ring 43 mounted on a housing 44 as an output-side rotation member, rollers 45 as torque transmission members, a cage 46, a centering spring 47 as an elastic member, a vehicle-body frame 48 and a sliding spring installation ring 49, both of which as stationary-side members, and a sliding spring 50 for applying rotational resistance to the cage 46. The connection between the axle shaft 41 and the clutch inner ring 42 as well as that between the housing 44 and the clutch outer ring 43 may be made by means such as a multi-faced joint structure, spline, serration or key. The "multi-faced joint structure" means, in general, a connection structure where one or a plurality of flat portions are respectively provided on both the internal periphery of a boss and on the outer periphery of a shaft to be inserted into the boss. When the two are fitted to each other at the flat portions, they are secured in a rotation direction.

The axle shaft 41 is directly connected to or connected through power transmission means such as chain to a drive portion (not shown; constituted with an electric motor and a speed reduction mechanism, for example). Also, the axle shaft 41 is rotatably supported in a cantilever manner at one end side (left-hand side of the figure; at the middle side of the axle shaft 41) of the clutch 10 by a vehicle-body frame 48 through a roller bearing 51. The roller bearing 51 is a sealed type having a seal installed at each of its end portions or at its one side at an end-face side of the clutch. The clutch inner ring 42 is fitted and fixed onto the outer periphery of the axle shaft 41.

In the example shown in the figure, the housing 44 constitutes a hub connected to a wheel 52. A flange portion 44a, extending in a radial direction, is formed in a unitized manner on the outer periphery of the housing 44, and the wheel 52 is connected to the flange portion 44a through hub bolts (not shown). A tire 60 is mounted on the wheel 52. The clutch outer ring 43 is fitted and fixed into the inner periphery at one end side of the housing 44. The housing 44 and the wheel 52 may be unitized together. Further, the housing 44 is rotatably supported by the axle shaft 41 through two roller bearings 54 and 55 that are arranged with spacing in an axial direction. Of the two roller bearings 54 and 55, the roller bearing 55 positioned at the outer side (side opposite to the roller bearing 54) is a sealed type having a seal installed at each of its end portions or at its one side at an end-face side of the clutch. The clutch having the supporting structure arranged in this way can endure high speed and high load operations. Also, using a sealed type as the roller bearing 51 and the roller bearing 55 positioned respectively at one end side and the other end side of the clutch makes foreign matter, such as dust, mud or water, difficult to enter into the inside of the clutch 10.

Figure 11:
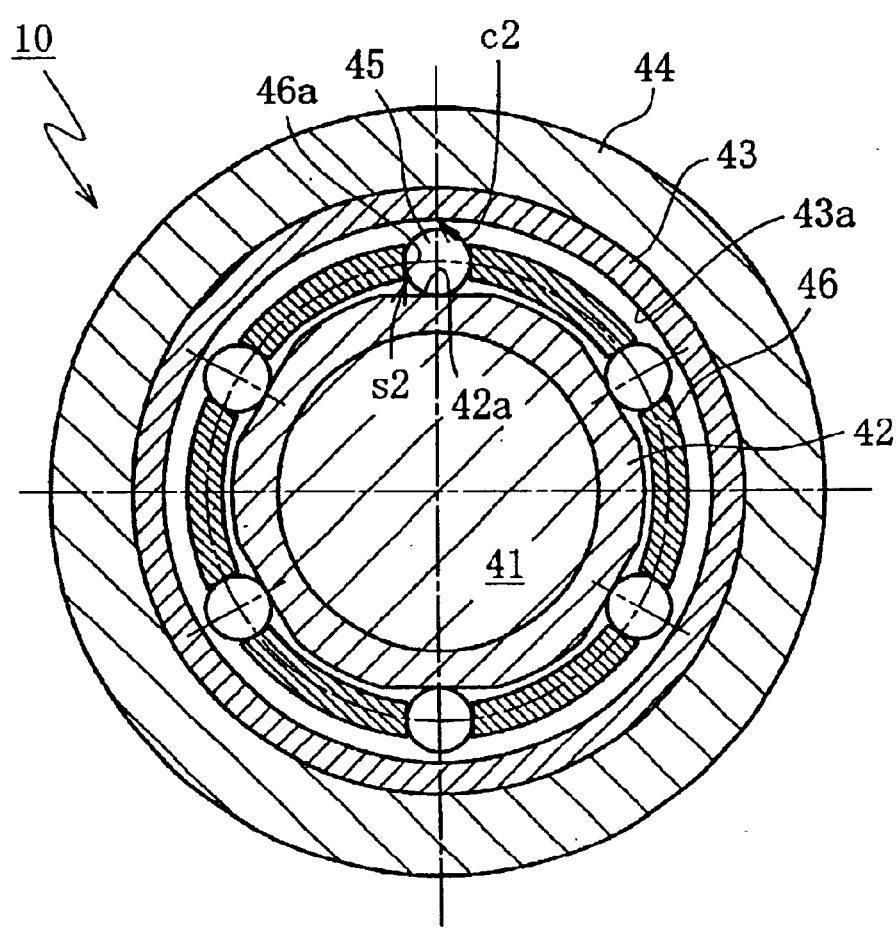
FIG. 11 is a cross-sectional view taken along the line X—X in FIG. 10.

FIG. 11 shows a cross-sectional view taken along the line X—X in FIG. 10. On the outer periphery of the clutch inner ring 42, there are provided flat-like cam faces (clutch faces) 42a, having the same number as the rollers 45, at equal spacing in a circumferential direction. Further, between the cam faces 42a and the hollow cylinder-shaped inner periphery (clutch face) 43a of the clutch outer ring 43, there are formed wedge gaps s2 of which each symmetrically reduces in both positive and negative rotation directions.

The cage 46 is formed in a substantially hollow cylinder shape, and has a plurality (with the same number as the rollers 45) of pockets 46a of a window shape for receiving the rollers 45. The individual rollers 45 are arranged in their corresponding individual wedge gaps s2, with each of the rollers 45 being respectively received and retained in its corresponding pocket 46a of the cage 46.

The diameter of the individual rollers 45 is set slightly smaller in a radial direction than the distance between the individual cam faces 42a of the clutch inner ring 42 at centers c2 in a circumferential direction of the wedge gaps s2 and the hollow cylinder-shaped inner periphery 43a of the clutch outer ring 43. Accordingly, there are gaps in a radial direction between the individual rollers 45 and their corresponding individual cam faces 2b as well as between the individual rollers 45 and the hollow cylinder-shaped inner periphery 43a.

As shown in FIG. 10, the cage 46a is provided at its one end portion with a hollow cylinder-shaped portion 46b. A part of the hollow cylinder-shaped portion 46b is opened in a specific circumferential direction to allow the sliding spring 50 to be coupled to the opening. Further, a stopper portion 46c of a cut-away shape is provided at the other end portion of the cage 46. The stopper portion 46c couples to the centering spring 47 for positioning the cage 46 with respect to the clutch inner ring 32.

Figure 12:
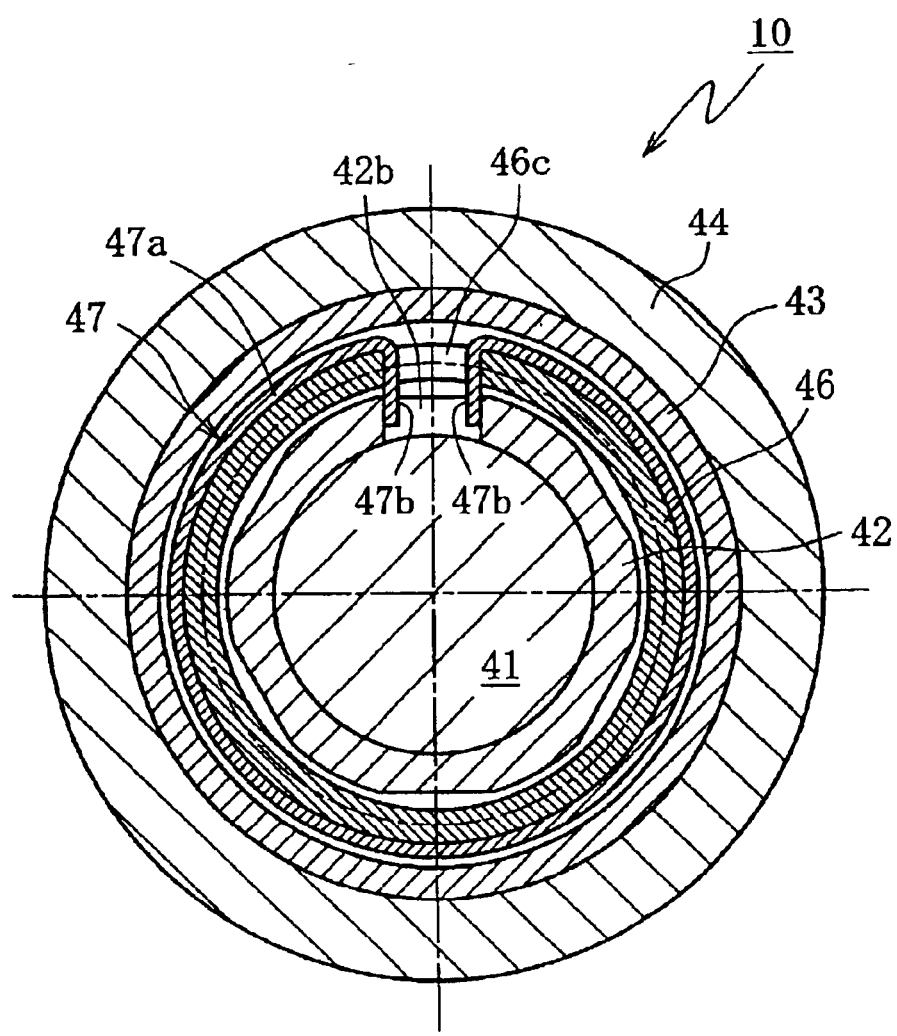
FIG. 12 is a cross-sectional view taken along the line Y—Y in FIG. 10.

FIG. 12 shows a cross-sectional view taken along the line Y—Y in FIG. 10. The centering spring 47, interposed between the clutch inner ring 42 and the cage 46, is provided with an annular portion 47a and a pair of coupling portions 47b extending toward the inside diameter direction from both ends of the annular portion 47a. Corresponding to the coupling portions 47b of the centering spring 47, the stopper portion 46c and a stopper portion 42c that have a cut-away shape are provided at the cage 46 and the clutch inner ring 42, respectively. The annular portion 47a of the centering spring 47 is fitted on the outer periphery of the cage 46. Also, the pair of coupling portions 47b of the centering spring 47 are installed and fitted in the stopper portions 46c and 42b of the cage 46 and the clutch inner ring 42, respectively.

In the state shown in FIG. 12, the pair of coupling portions 47b individually and elastically contact the side walls in a circumferential direction of the stopper portions 46c and 42b. With this arrangement, the clutch inner ring 42 and the cage 46 are connected to each other in a rotation direction, while at the same time the cage 46 is positioned (centered) in a circumferential direction with respect to the clutch inner ring 42. FIG. 11 shows a state where the cage 46 is centered by the centering spring 47. In this state, the individual centers in a circumferential direction of the pockets 46a of the cage 46 agree in position with the individual centers in a circumferential direction of the cam faces 42. The individual rollers 45 are thus positioned at the centers in a circumferential direction of the corresponding individual wedge gaps s2.

Figure 13:
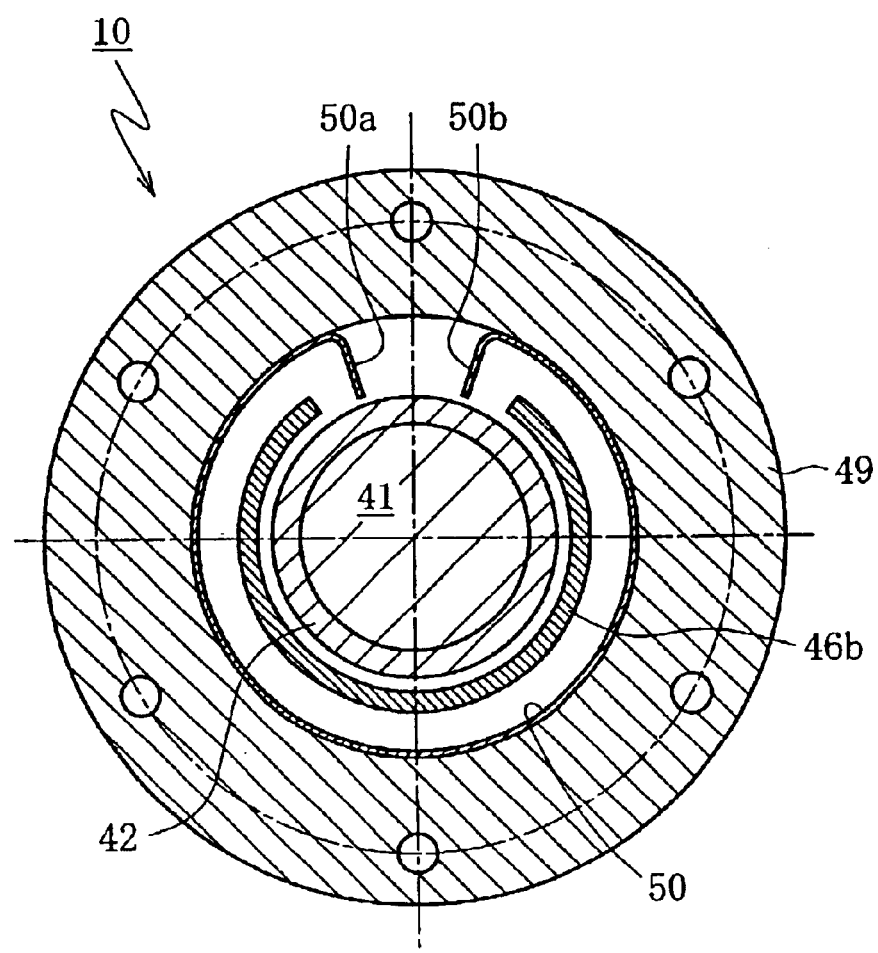
FIG. 13 is a cross-sectional view taken along the line Z—Z in FIG. 10.

FIG. 13 shows a cross-sectional view taken along the line Z—Z in FIG. 10. The sliding spring 50 is an open ring-shaped elastic member fitted on the inner periphery of the sliding spring installation ring 49, and provided with coupling pieces 50a and 50b of which both are end-portions of the opening bent toward the inside diameter side. The coupling pieces 50a and 50b of the sliding spring 50 are inserted into the opening portion of a hollow cylinder-shaped portion 46b of the cage 46. When the cage 46 rotates, it contacts either of the coupling pieces 50a and 50b, positioned at the forward in a rotation direction of the opening end portions of the hollow cylinder-shaped portion 46b, causing the sliding spring 50 to co-rotate.

The clutch 10 transmits rotational torque applied to the clutch inner ring 42 from the axle shaft 41 to the clutch outer ring 43. Also, the clutch serves as a reverse-input shutoff clutch for shutting off rotational torque applied to the clutch outer ring 43. That is, when rotational torque is applied to the clutch inner ring 42, the sliding spring 50 applies rotational resistance, induced by slide friction, to the cage 46. This results in elastic deformation of the centering spring 47, thereby causing rotational delay of the cage 46. When the cage 46 has delay in rotation, the rollers 45 are engaged with the wedge gaps s2 and rotational torque applied to the clutch inner ring 42 is transmitted to the clutch outer ring 43 through the roller 45. On the other hand, slide friction resistance of the sliding spring 50 is not generated against rotational torque applied from the housing 44 to the clutch outer ring 43. In this case, the cage 46 is kept centered by the action of the centering spring 47. In a state where the cage 46 is being centered, the rollers 45 are positioned at the centers c2 in a circumferential direction of the wedge gaps s2 and can rotate on their own axes. Therefore, rotational torque from the clutch outer ring 43 is shut off against the clutch inner ring 42.

Detailed description will be made below for action of the sliding spring 50 that applies rotational resistance to the cage 46 when rotational torque is applied to the clutch inner ring 42.

Figure 14:
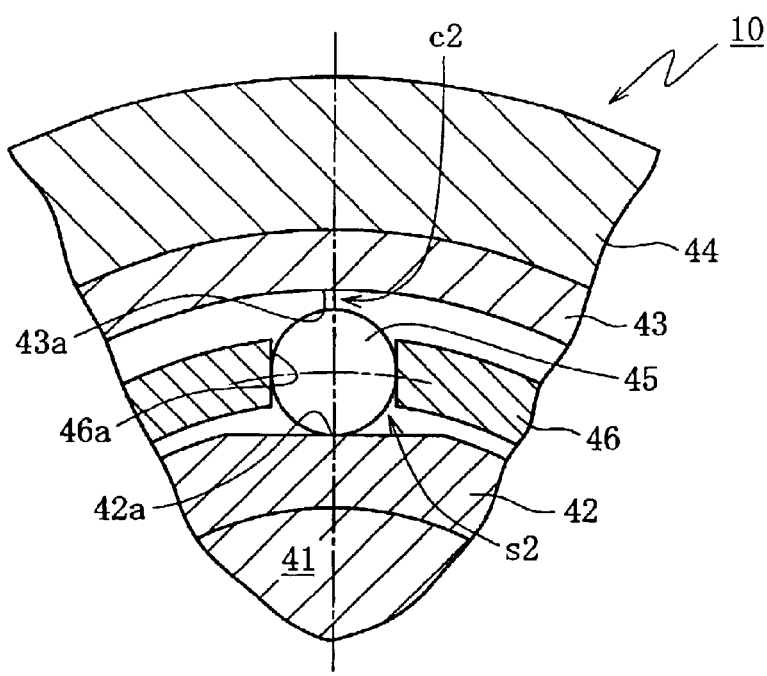
FIG. 14 is a cross-sectional view showing an initial state of a roller.
Figure 15:
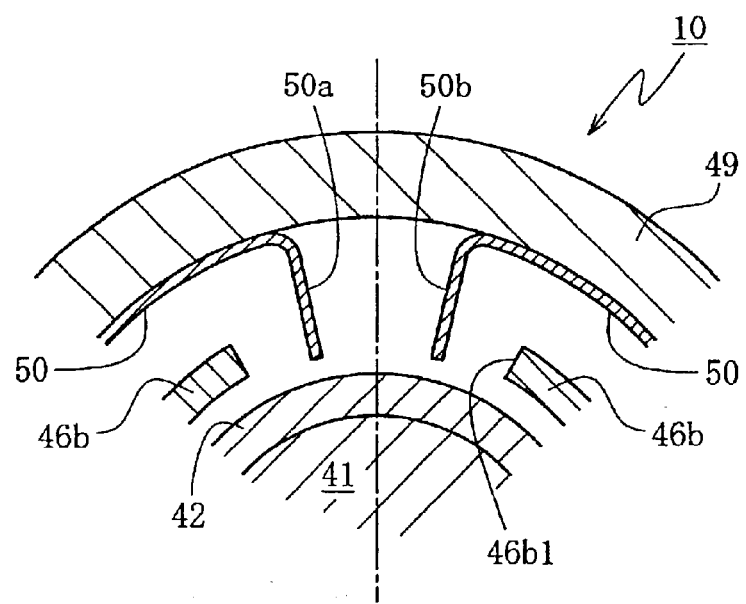
FIG. 15 is a cross-sectional view showing an initial state of a sliding spring.

(1) In an initial state where rotational torque is not yet applied to the clutch inner ring 42, as shown in FIG. 12, the cage 46 is being centered by the centering spring 47. Also, the rollers 45 received in the pockets 46a of the cage 46 are, as shown in FIG. 14, being positioned at the centers in a circumferential direction of the wedge gaps s2 between the cam faces 42a of the clutch inner ring 42 and the inner periphery 43a of the clutch outer ring 43.

Figure 16:
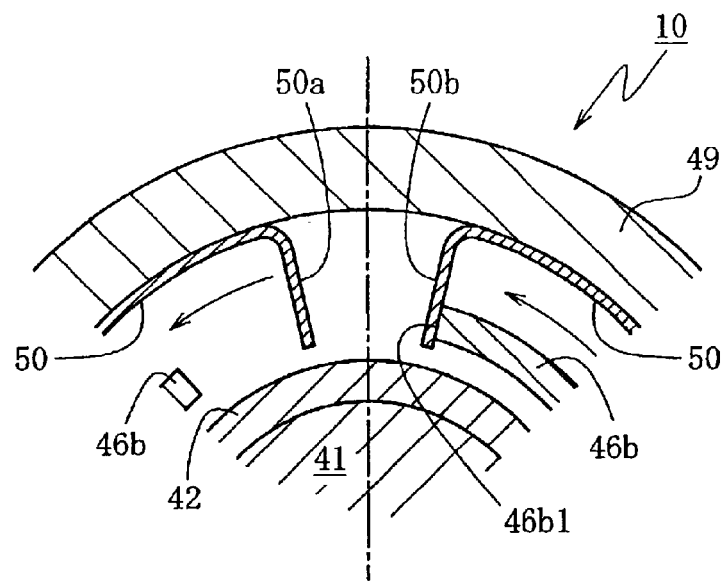
FIG. 16 is a cross-sectional view showing a state where a hollow cylinder-shaped portion of a cage is in contact with a sliding spring.

(2) When rotational torque, for example, in a counterclockwise direction in the figure is applied to the clutch inner ring 42, the cage 46 starts to rotate with the clutch inner ring 42, because the cage 46 is connected to the clutch inner ring 42 with the centering spring 47. Further, when the cage 46 has rotated a specific angle, as shown in FIG. 16, it is a state where a side face 46b1 at the backward side in a rotation direction of the opening portion of the hollow cylinder-shaped portion 46b of the cage 46 contacts the coupling piece 50b of the sliding spring 50.

Figure 17:
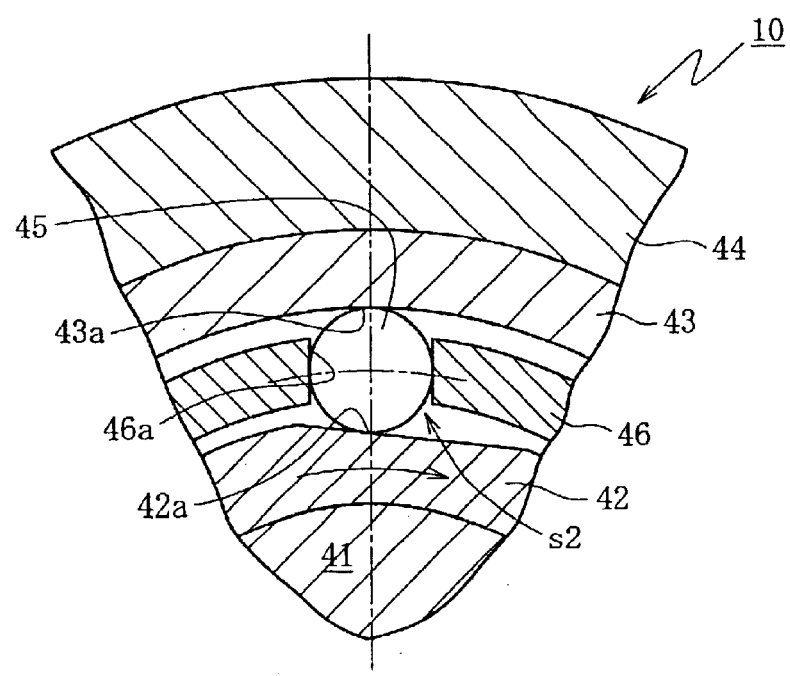
FIG. 17 is a cross-sectional view showing a state where a roller is engaged with a wedge gap.

(3) When the clutch inner ring 42 further rotates, the sliding spring 50 co-rotates, with the hollow cylinder-shaped portion 46b of the cage 46 being in contact with the coupling piece 50b of the sliding spring 50. As the sliding spring 50 rotates in a sliding manner on the inner periphery of the sliding spring installation ring 49, it is subjected to slide friction resistance as it rotates. The slide friction resistance is transmitted from the coupling piece 50b to the hollow cylinder-shaped portion 46b of the cage 46 and becomes rotational resistance of the cage 46. On the other hand, the rotational resistance (torque) of the cage 46 caused by the slide friction resistance of the sliding spring 50 is larger than elastic force (spring torque) of the centering spring 47. Consequently, as shown in FIG. 17, the elastic centering spring 47 elastically deforms, and the cage 46 starts to delay in rotation with respect to the clutch inner ring 42 by an extent corresponding to the degree of the deformation. (4) The rotational delay of the cage 46 caused by the elastic deformation of the centering spring 47 causes the roller 45 received in the pocket 46a to be engaged with the wedge gaps s2 between the cam faces 42a of the clutch inner ring 42 and the inner periphery 43a of the clutch outer ring 43. This causes a rotational torque applied to the clutch inner ring 42 to be transmitted to the clutch outer ring 43 through the rollers 45. Because slide friction resistance of the sliding spring 50 is independent of rotation speed, the hollow cylinder-shaped portion 46b of the cage 46 couples to the coupling piece 50b of the sliding spring 50 when rotational torque is applied to the clutch inner ring 42. Then the centering spring 47 deflects, the rollers 45 are engaged with the wedge gaps s2, and rotational torque is transmitted to the clutch outer ring 43. As a consequence, the wheel 52 and the tire 60, mounted on the housing 44, are rotated by the rotational torque applied.

This is how rotational torque applied to the clutch inner ring 42 is transmitted to the clutch outer ring 43. Also, when the clutch inner ring 42 stops to rotate, the rollers 45 are disengaged from the wedge gap s2 by restoring force of the centering spring 47 and centered at the centers c2 in a circumferential direction of the wedge gaps s2.

It may occur, however, that the rollers 45 are kept engaged with the wedge gaps s2 even after the clutch inner ring 42 has stopped to rotate. This occurs when, for example, engagement force (residual torque) acting on the rollers 45 is larger than restoring force of the centering spring 47.

If this happens, the rollers 45 can be disengaged from the wedge gaps s2 in the following way. That is, rotational torque in a clockwise direction (direction opposite to that of applied rotational torque) is applied (with reverse rotation means arranged) to both the axle shaft 41 and the clutch inner ring 42. Then the clutch inner ring 42 in a clockwise direction (by being rotated in the reverse direction) with respect to the cage 46, and thus the rollers 45 can be disengaged from the wedge gaps s2. Once this has been done, the cage 46 is centered by restoring force of the centering spring 47, and the rollers 45 move to the centers c2 in a circumferential direction of the wedge gaps s2. Thus the clutch 10 is in the initial state. What is described above is a case where rotational torque in a counterclockwise direction is applied to the clutch inner ring 42; however, the same process applies to a case where rotational torque in a clockwise direction is applied.

The clutch 10 of the second embodiment according to the invention has been described; however, the clutch 10 is not limited to the details disclosed and described above. For example, the sliding spring 50 for applying rotational resistance to the cage 46 is replaceable with the rotational resistance applying structure shown in FIGS. 9(a) and (b).

Although the reverse-input shutoff clutch according to the invention has been described above, the invention is not limited to those described.

For example, rotational resistance applying means for causing slide friction resistance to act on a cage against the rotation of the cage with respect to a stationary-side member may be constituted as follows. That is, the means may be such that the cage and the stationary-side member are directly contact each other (or such that, at either of the cage or the stationary-side member, a member contacting the other of the two is provided so that the cage and the stationary-side member indirectly contact each other). When arranged this way, the cage rotates while it contacts the stationary-side member.

Further, in the embodiments of both the clutch 10 and the clutch 10, the sliding spring 17 (sliding spring 50) as a sliding member is coupled to the cage 14 (cage 46), respectively, and slides against the stationary-side member. The arrangement of the rotational resistance applying means is not limited to this. For example, the rotational resistance applying means can be arranged in such a way that it slides, with itself being coupled to the stationary-side member in a circumferential direction and in a stationary state, against the cage that is rotating. In this case, when the cage rotates with respect to the stationary-side member, the sliding member causes slide friction resistance to act on the cage. Further, the sliding member may be made of, for example, an elastic member such as a spring. Further, this sliding member may also be a member provided with an annular ring and an elastic member that are arranged in the following way, respectively. That is, the annular ring is arranged in position with a specific spacing in a radial direction kept from the cage and coupled to the stationary-side member in a circumferential direction. Also the elastic member is, while contacting both the annular ring and the stationary-side member, interposed in a space continuous in a circumferential direction between the annular ring and the cage.

The reverse-input shutoff clutch 10 described above can be assembled into not only the electricity-assisted trolley, but also into various mechanisms and devices. One of the examples is its applications for drive mechanisms of systems such as electricity-driven curtains or electricity-assisted wheel chairs. In such applications, an object to be operated is driven by a rotation drive source such as a motor, while it is also required that the object are manually operated. In such a case, the required function is obtainable by interposing the reverse-input shutoff clutch 10 in the torque transmission path between the rotation drive source and the object to be driven. That is, in this clutch 10, because an output-side rotation member (such as the output inner ring 12) freely rotates against reverse-input torque applied from the output side, an element as an object to be driven such as a curtain system or a wheel can be manually moved.

Further, when the reverse-input shutoff clutch 10 is assembled into drive sources for different kinds of doors of an automobile, such as a rear door, side door, sliding door, trunk door, and engine hood, opening and closing can be made not only with assistance of electricity, but the operation can also be made manually with ease.

Figure 18:
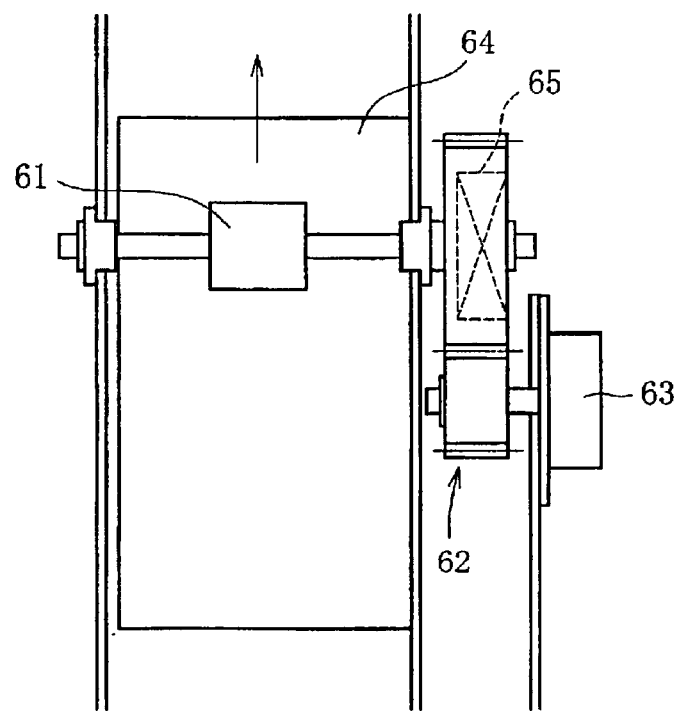
FIG. 18 is a plan view showing a conventional paper-feed mechanism.
Figure 19:
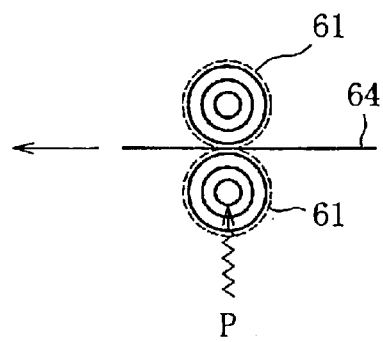
FIG. 19 is a cross-sectional view of a paper-feed mechanism.

Additionally, the reverse-input shutoff clutch can be assembled into a paper-feed mechanism of a copy machine or a printer. A paper-feed mechanism has, as shown in FIGS. 18 and 19, a structure to drive paper-feed rollers 61 with a motor 63 through speed reduction gearing 62. In this paper-feed mechanism, paper jamming may occur by some reason or other, and when it occurs, a jammed paper 64 must be pulled out by hand with the motor being stopped. The paper-feed rollers 61 rotate as the paper is pulled for removal, and torque of the motor 63 connected to the paper-feed rollers is applied to the paper, making the pulling out work difficult. Particularly in the fixing portion, a large nip pressure P is applied to the rollers 61, thereby causing the motor 63 to exert large torque. Therefore the pulling out of the paper 64 involves difficulty.

Conventionally, a one-way clutch 65 has been assembled between the motor 63 and the paper-feed rollers 61. The one-way clutch enable the rollers 61 to be freely rotated in one direction, or the direction to pull out the paper illustrated in FIG. 19 (same direction as the paper feeding, shown by the arrow), so that motor torque is not applied to the paper 64. In this case, however, because the direction of pulling the paper 64 is limited to one direction, the pulling out of the paper becomes difficult depending on which part of the paper the jamming has occurred.

Figure 20:
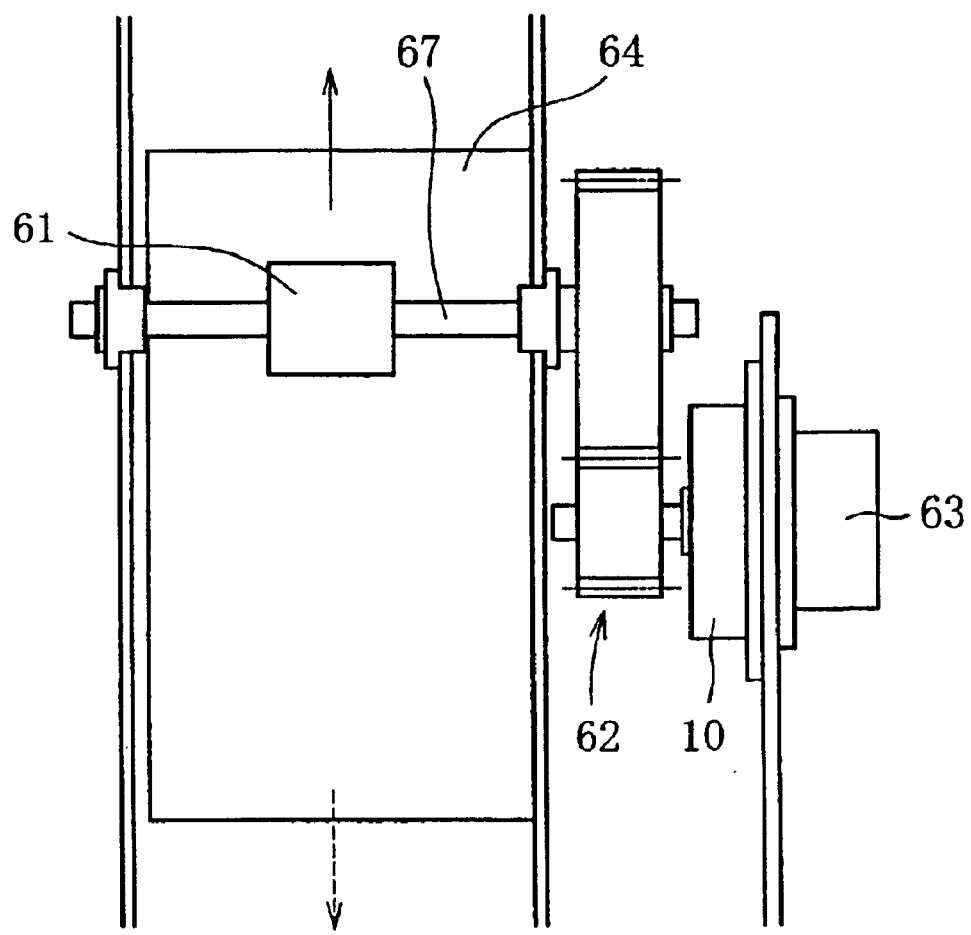
FIG. 20 is a plan view of a paper-feed mechanism using a reverse-input shutoff clutch.

On the other hand, as show in FIG. 20, when the reverse-input shutoff clutch 10 is arranged between the motor 63 and the paper-feed rollers 61, drive force from the motor 63 is transmitted to the paper-feed rollers while enabling the jammed paper 64 be pulled out from both directions (upward or downward direction in the figure) of roller shafts 67, facilitating work of releasing the jammed paper. Further, when a paper is fed from low-speed rollers (not shown) located at the upstream side, the reverse-input shutoff clutch connected to high-speed rollers at the downstream side freely rotates to absorb the difference in speed between the rollers.

Figure 21:
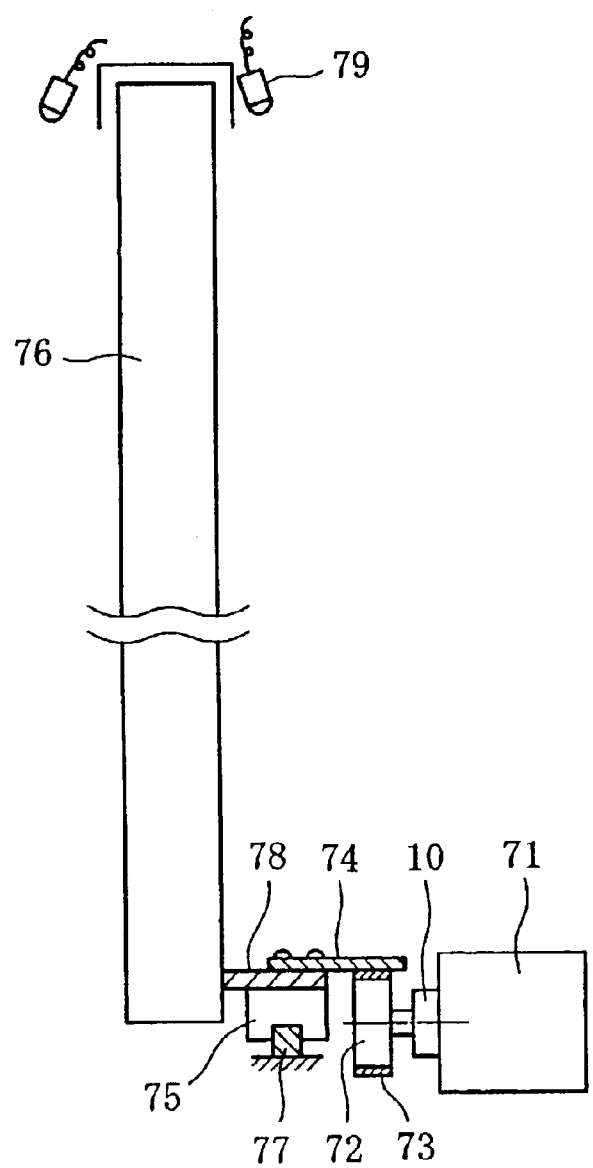
FIG. 21 is a cross-sectional view showing a drive mechanism of an automatic door system using a reverse-input shutoff clutch.

FIG. 21 shows a case where the reverse-input shutoff clutch 10 is assembled into the drive portion of an automatic door system (electric-powered sliding door). The drive portion transmits rotational torque of a motor 71 or the like to a pulley 72 through the reverse-input shutoff clutch 10 to drive a belt 73 wound on the pulley 72. A linear bearing 75 is connected to the belt 73 through a connection member 75. The linear bearing 75 is guided with a rail 77 extending along a movement direction (perpendicular to this paper face) of a door 76. Also, the lower part of the door 76 is connected to the linear bearing 75 through a support member 78. When the motor 71 is driven in a positive or negative direction, the pulley 72 and the belt 73 rotates in a positive or negative direction through the reverse-input shutoff clutch 10, thereby reciprocally sliding the linear bearing 75 and further the door 76.

In an ordinary automatic door, it is arranged such that a pedestrian approaching the door is detected with a sensor 79 and then the motor 71 is driven. In this case, therefore, once the sensor 79 fails, the door 76 cannot be opened or closed unless power supply to the motor is cut out. On the other hand, when the reverse-input shutoff clutch 10 is assembled into the drive portion as show in FIG. 21, the door 76 can be manually opened and closed with ease without cutting out the power supply to the motor even when the sensor 79 fails. This is because the output shaft of the clutch 10 can be freely rotated in both directions for opening and closing the door 76.

Further, the reverse-input shutoff clutch 10 can be assembled into the rear axle shaft of a bicycle. Generally, in the rear axle shaft of a bicycle, power from the pedals is transmitted to the rear wheel through a ratchet type one-way clutch, where free rotation of the ratchet wheel creates sounds (clicking sounds) when the bicycle is reversed. On the other hand, with the reverse-input shutoff clutch assembled in the axle shaft, this kind of sound is not created, thereby enhancing a quality image.

Further, the reverse-input shutoff clutch 10 can be assembled into a screw-propeller portion of a ship such as a boat. In a boat, generally, the propeller is driven with the engine of which power is transmitted to the propeller through a clutch and transmission shaft. Therefore, when trying to advance a boat with inertia with the engine stopped, the boat is subjected to rotational resistance of the transmission shaft in addition to resistance from the propeller. When the reverse-input shutoff clutch 10 is interposed between the transmission shaft and the propeller, the propeller alone can be allowed to rotate when a boat advances with inertia, reducing resistance to improve operation capability of the boat.

Figure 22:
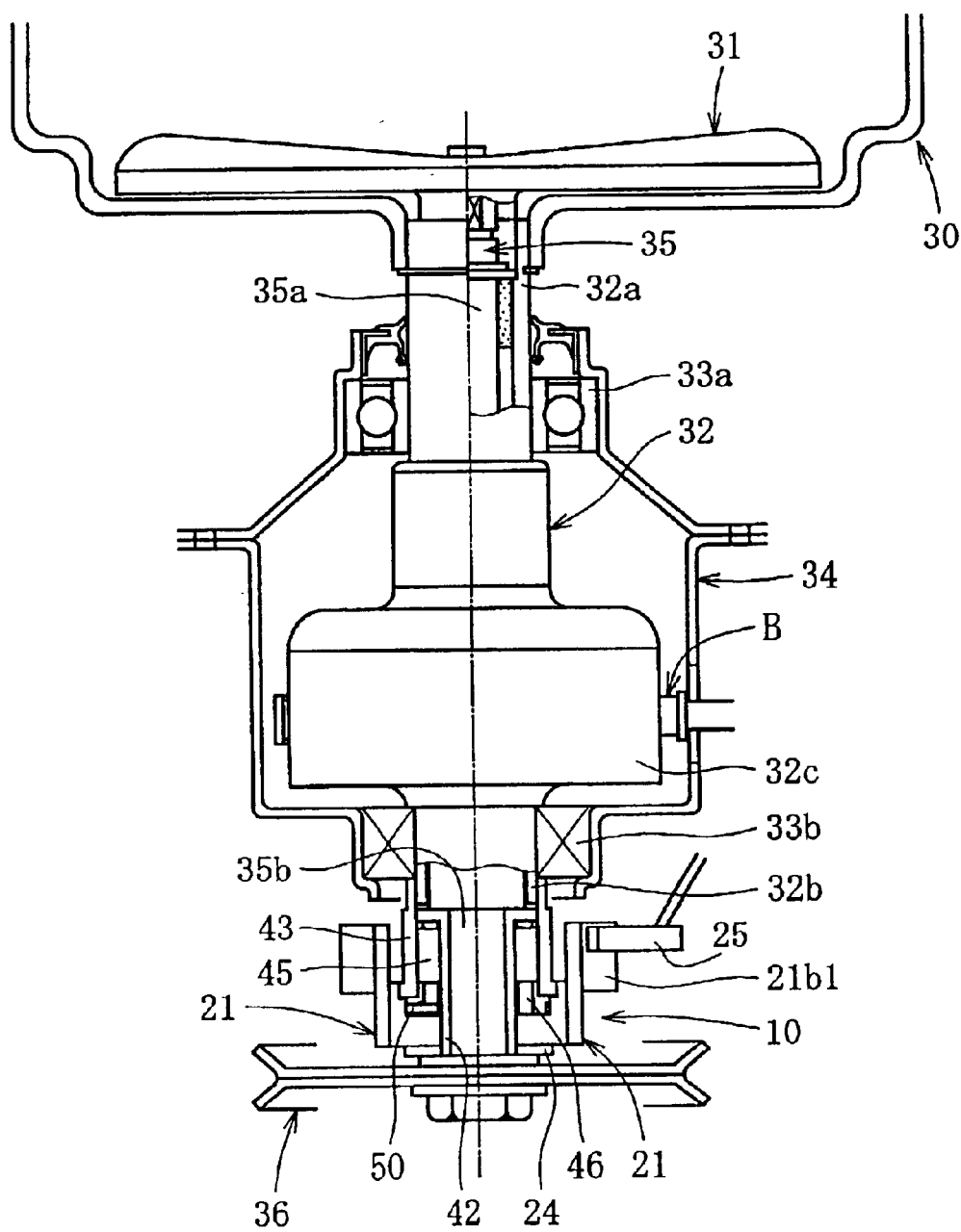
FIG. 22 is a cross-sectional view showing a fully automatic washing machine using a reverse-input shutoff clutch.
Figure 23:
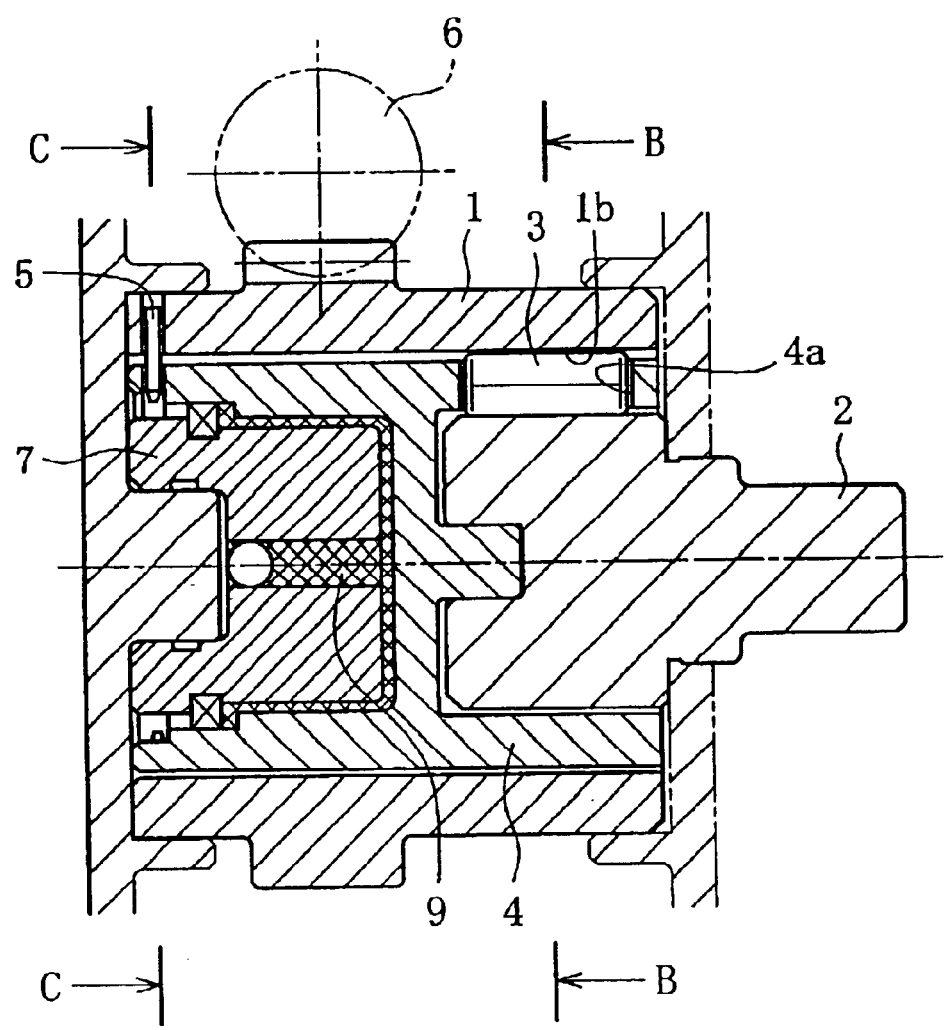
FIG. 23 is a longitudinal cross-sectional side view (taken along the line A—A in FIG. 24(a)) of a conventional clutch.
Figure 25:
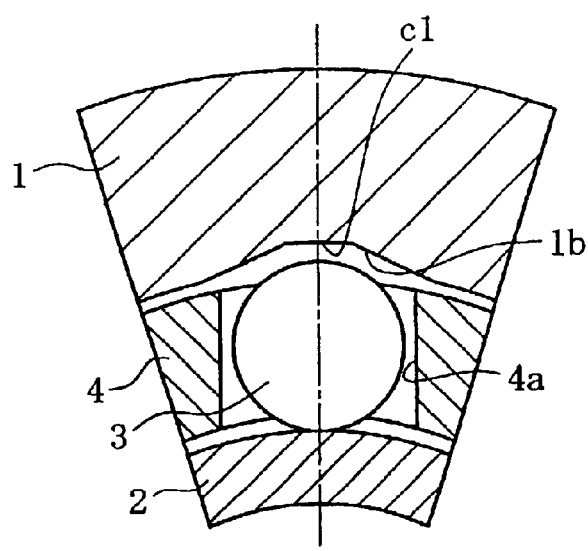
FIG. 25(a) is an enlarged cross-sectional view showing about one of the cam face illustrated in FIG. 24(a)
FIG. 25(b) is a drawing showing a state where a roller is engaged in a wedge gap.
Figure 25:
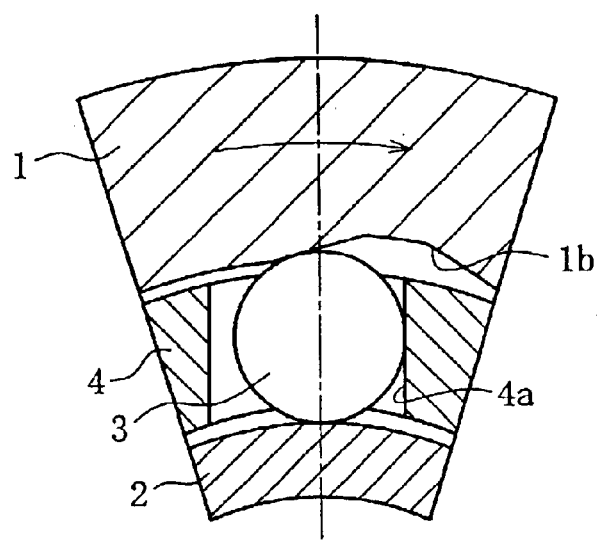
Figure 26:
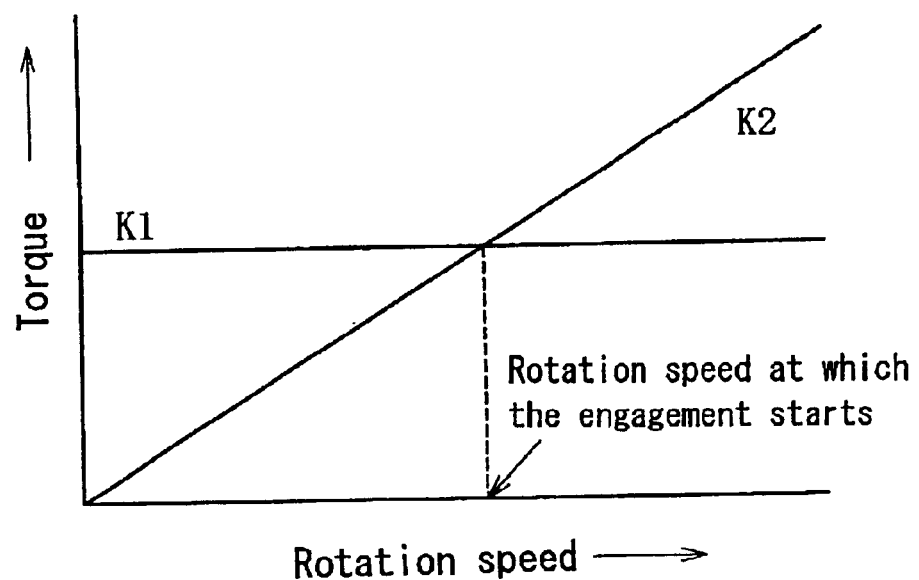
FIG. 26 is a diagram showing the relationship between spring torque K1 of a centering spring and viscous resistance K2.

FIG. 22 shows a case where the reverse-input shutoff clutch 10 is assembled into a rotary driving part of an fully automatic washing machine that conducts washing, rinsing, and spin-drying using one washing drum.

In this fully automatic washing machine, a pulsator 31 is rotatably arranged at the center of the upper face of the bottom of a washing drum 30, and a hollow washing-drum shaft 32 is connected to the lower part at the center of the bottom. The washing-drum shaft 32 is provided with an upper shaft portion 32a and a lower shaft portion 32b, and both the shaft portions 32a and 32b are connected to each other through a brake drum portion 32c having a large diameter. The upper shaft portion 32a is rotatably supported by a washing machine frame 34 through an upper bearing 33a, and the lower shaft portion 32b is rotatably supported by the washing machine frame 34 through a lower bearing 33b. A one-way brake, or a brake belt B for example, is arranged on the outer periphery of the brake drum portion 32c. The washing-drum shaft 32 is subjected to braking force when the brake belt B is pressed against the brake drum portion 32c.

The pulsator 31 is connected to a pulsator shaft 35, which is rotatably inserted through the bore portion of the washing-drum shaft 32. The pulsator shaft 35 is provided with an upper shaft portion 35a and a lower shaft portion 35b. Both the shaft portions 35a and 35b are connected to each other through a speed reduction mechanism, or, for example, a planetary-gear speed reduction mechanism (figure omitted), arranged in the bore portion of the brake drum portion 32c. Further, the pulsator 31 is connected to the shaft end of the upper shaft portion 35a of the pulsator shaft 35, and power transmission means such as a drive pulley 36 is connected to the shaft end of the lower shaft portion 35b. Positive and negative torque is applied to the drive pulley 36 from a drive source (not shown), such as an electric motor, through power transmission means such as a belt. Thus the pulsator shaft 35 and further the pulsator 31 are rotated in positive and negative directions.

The reverse-input shutoff clutch 10 for controlling transmission and shutting off the torque transmitted from the pulsator shaft 35 to the washing-drum shaft 32 is interposed between the lower shaft portion 35b of the pulsator shaft 35 and the lower shaft portion 32b of the washing-drum shaft 32. The reverse-input shutoff clutch 10 used in this example is the inner ring input type described referring to FIGS. 10 to 17. In the description below, the members and elements having the same functions and actions as those of the embodiment illustrated in FIGS. 10 to 17 are denoted by the like numerals, and the descriptions of such members and elements are omitted. In this embodiment, a ring-shaped control member 21 is substituted for the sliding spring installation ring 49 in FIG. 10. In this reverse-input shutoff clutch 10, the switching of the states between an operation state and a non-operation state is made possible in addition to the function described above of shutting off reverse-input torque. The operation state means a state for transmitting torque, applied to the inner ring 42, to the outer ring 43, and the non-operation state means a state for shutting off the transmission of torque, applied to the inner ring 42, to the outer ring 43. The switching between the two states can be conducted by restricting the rotation of the control member 21 and the removal of the restriction.

First, a case where the rotation of the control member 21 is restricted will be described below. The control member 21 is a stationary-side member in this case. When torque is applied to the inner ring 42 in this state, the cage 46 is rotated by torque applied from the inner ring 42 through a centering spring (not shown; the spring 47 in FIG. 12 can be used, for example). At this time, the sliding spring 50 applies rotational resistance, induced by its slide friction resistance, to the cage 46, which results in deformation of the centering spring to cause the cage 46 to delay in rotation. In this case, the rollers 45 come to the engaged state, so that rotational torque applied to the inner ring 42 is transmitted to the outer ring 43 through the rollers.

On the other hand, friction resistance of the sliding spring 50 is not generated by reverse-input torque applied to the outer ring 43, and therefore the cage 46 is centered by the action of the centering spring. Consequently, the rollers are disengaged from the wedge gaps, and the transmission of torque from the outer ring 43 to the inner ring 42 is shut off.

Next, a case where the rotation restriction is removed from the control member 21 will be described. When torque is applied in this state to the inner ring 42, in the same way as the case of the operation state, the cage 46 is rotated by the torque applied from the inner ring 42 through the centering spring. At this time, however, because the rotation restriction to the control member 21 has been removed, the control member 21 synchronously rotates with the inner ring 42 and the cage 46 or rotates with delay with respect to the inner ring 42 and the cage 46. This occurs because of friction force generated at a contact portion between the inner periphery of the control member 21 and the inner ring 42 or at a contact portion between the control member 21 and a cage ring 24 installed at an end face of the inner ring 42. That is, in this case, the control member 21 is not a stationary-side member but is a rotation-side member. Also, in this case, the relationship between the spring torque K1 of the centering spring and friction torque K2 generated by the sliding spring 50 is expressed by K1>K2. Accordingly, the centering spring does not deflect, and the cage 46 rotates while it is being centered with respect to the inner ring 42. Therefore, in both cases described above, the rollers 45 do not engage with the wedge gaps and are in a state where they are disengaged from the inner ring 42 and the outer ring 43. As a consequence, the transmission of input torque from the inner ring 42 to the outer ring 43 is shut off, and the inner ring 42 and the outer ring 43 are in a state where they can freely rotate with respect to each other. In this way, the clutch 10 can be set at the non-operation state by removing the rotation restriction of the control member 21.

In this embodiment, switching the reverse-input shutoff clutch 10 between the operation and non-operation states, or the switching the control member 21 between the state of the rotation restriction and the state where the restriction is removed, is made by a operation member 25 as shown in FIG. 22. The operation member 25 shown as an example in the figure is arranged in a manner where it can swing about a specific axis, and provided with a coupling element that can be coupled to the control member 21. The operation member 25 is swung and operated by operation means, such as wire or an arm, and switched between the position (hereinafter referred to as "restriction position") where the control member 21 is restricted for rotation by the coupling of the operation member 25 to a coupling portion 21b1 provided on the control member 21 and the position (hereinafter referred to as "removal position") where the rotation restriction is removed from control member 21 by the uncoupling of the operation member 25 from the coupling portion 21b1. The switching of the operation member 25 is made in an automatic manner that is interlocked with the switching between a washing and spin-drying modes of the fully automatic washing machine. The operation member 25 may be constituted in such a way that it can move forwards and backwards in a radial direction with respect to the control member 21. By doing so, switching the control member 21 between the rotation restriction and the restriction removal is made by operating the operation member 25 forwards and backwards.

When the fully automatic washing machine is at the washing mode, the operation member 25 is kept at the removal position and the brake belt B is kept at the non-operation state (where the brake belt B is not in contact with the brake drum 32c). When the operation member 25 is at the removal position, the clutch 10 is in the non-operation state. Accordingly, transmission of torque between the pulsator shaft 35 and the washing-drum shaft 32 is shut off by the clutch 10, and the pulsator shaft 35 and the washing-drum shaft 32 can freely rotate with respect to each other. When positive and negative torque is applied in this state to the pulsator shaft 35 from an electric motor (not shown), the transmission of torque from the pulsator 35 to the washing-drum shaft 32 is shut off by the clutch 10. The input torque is therefore applied only to the pulsator shaft 35, which causes the pulsator shaft 35 and the pulsator 31 to rotate in positive and negative directions. Consequently, water streams are generated in the washing drum 30 as the pulsator 31 rotates in positive and negative directions. Since both the clutch 10 and the brake belts B are being kept in the non-operation state, the washing-drum shaft 35 and the washing drum 30 are freely rotated in both positive and negative directions by drive force of the water streams. Therefore, at the time when a rotation direction is switched, relative rotation occurs between the pulsator 31 and the washing drum 30 that still rotates with inertia in the direction to which the washing drum 30 had been rotating before the switching, thereby enhancing washing capability of the washing machine.

When the fully automatic washing machine is set at the spin-drying mode upon completion of washing, the operation member 25 is switched to the restriction position. When the operation member 25 is at the restriction position, the clutch 10 is in the operation state. Accordingly, torque is transmitted between the pulsator shaft 35 and the washing-drum shaft 32 through the clutch 10. When torque in a specific direction (positive or negative direction) is applied in this state to the pulsator shaft 35 from an electric motor (not shown), the applied torque is transmitted to the washing-drum shaft 32 through the clutch 10. This results in the synchronized rotation of the pulsator shaft 35 and the washing-drum shaft 32. Thus the washing drum 30 rotates in a specific direction to conduct spin-drying. When the fully automatic washing machine comes to the stop mode after completing the spin-drying, the electric motor stops and the brake belt B is switched to the operation state. With the operation of the brake belt B, the washing-drum shaft 32 and the washing drum 30 stop to rotate to complete the spin-drying.

In a conventional fully automatic washing machine, various controls described above have been made using a brake belt, one-way clutch, and spring clutch. When the reverse-input shutoff clutch 10 is used, however, the number of clutch elements is reduced by one from a conventional fully automatic washing machine. Thus the structure is more compact and simpler, and also costs are reduced.

The reverse-input shutoff clutch according to the invention is provided with rotational resistance applying means for causing friction resistance to act on a cage against its rotation with respect to a stationary-side member. Therefore, rotational resistance acting on the cage is independent of the rotation speed of the cage and determined by the rotation angle of the cage. As a result, the problem of start-up response is improved so that rotational torque applied to an input-side rotation member is instantly transmitted to an output-side rotation member. Also, because rotational resistance acting on the cage is not affected by temperature, operation characteristics of the clutch change little in changes in ambient temperature.

The rotation drive device according to the invention is assembled with the clutch described above. Therefore, the problem of start-up response is improved and rotational torque applied from a rotation drive source is relatively quickly transmitted to an output-side rotation member. Also, operation characteristics of the clutch change little even when ambient temperature changes. Further, a member as an object to be driven can also be manually operated by allowing an output-side rotation member to freely rotate against rotational torque from an output side. This further expands application fields of the clutch.

What is claimed is:

1. A reverse-input shutoff clutch comprising:
   an input-side rotation member;
   an output-side rotation member;
   a torque transmission member that can be engaged with and disengaged from said input-side rotation member and the output-side rotation member in both positive and negative rotation directions;
   a cage for retaining said torque transmission member and switching between the engagement and disengagement of the torque transmission member through the relative rotation of the cage with respect to said input-side rotation member;
   a stationary-side member;
   an elastic member for connecting the input-side rotation member and the cage in both positive and negative directions; and
   rotational resistance applying means for causing slide friction resistance to act on the cage against its rotation with respect to the stationary-side member,
   wherein rotational resistance of the cage caused by the slide friction resistance is larger than elastic force of the elastic member, and
   wherein through the control of a rotational phase difference between the input-side rotation member and the cage, the transmission of positive and negative rotational torque from said input-side rotation member to the output-side rotation member is conducted by the engagement of the torque transmission member to said input-side and output-side rotation members, while the transmission of positive and negative rotational torque from said output-side rotation member is shutoff by the disengagement of said torque transmission member.

2. The reverse-input shutoff clutch according to claim 1, wherein the output-side rotation member is allowed to freely rotate against positive and negative rotational torque from the output side.

3. The reverse-input shutoff clutch according to claim 1 or 2, wherein said rotational resistance applying means is a sliding member arranged in such a way that it can be coupled in a circumferential direction to either of said cage or the stationary-side member and slid against the other.

4. The reverse-input shutoff clutch according to claim 3, wherein said sliding member is arranged in such a way that it slides, with itself being coupled to said cage in a circumferential direction, against the stationary-side member.

5. The reverse-input shutoff clutch according to claim 4, wherein said sliding member is a sliding spring having a sliding portion installed at said stationary-side member and a coupling portion, extending from said sliding portion toward a radial direction, which can be connected to the cage in a circumferential direction.

6. A rotation drive device comprising:
   a rotation drive source;
   a speed reduction mechanism portion for reducing rotation torque applied from the rotation drive source; and
   the reverse-input shutoff clutch according to claim 5.

7. The rotation drive device according to claim 6, further comprising a housing for accommodating the speed reduction mechanism portion and the reverse-input shutoff clutch.

8. The reverse-input shutoff clutch according to claim 4, wherein said sliding member is provided with an annular ring that can be coupled to said cage in a circumferential direction and an elastic member interposed between said annular ring and the stationary-side member.

9. A rotation drive device comprising:
   a rotation drive source;
   a speed reduction mechanism portion for reducing rotation torque applied from the rotation drive source; and
   the reverse-input shutoff clutch according to claim 8.

10. The rotation drive device devise according to claim 9, further comprising a housing for accommodating the speed reduction mechanism portion and the reverse-input shutoff clutch.

11. A rotation drive device comprising:
    a rotation drive source;
    a speed reduction mechanism portion for reducing rotation torque applied from the rotation drive source; and
    the reverse-input shutoff clutch according to claim 4.

12. The rotation drive device according to claim 11, further comprising a housing for accommodating the speed reduction mechanism portion and the reverse-input shutoff clutch.

13. A rotation drive device comprising:
    a rotation drive source;
    a speed reduction mechanism portion for reducing rotation torque applied from the rotation drive source; and
    the reverse-input shutoff clutch according to claim 3.

14. The rotation drive device according to claim 13, further comprising a housing for accommodating the speed reduction mechanism portion and the reverse-input shutoff clutch.

15. A rotation drive device comprising:
    a rotation drive source;
    a speed reduction mechanism portion for reducing rotation torque applied from the rotation drive source; and
    the reverse-input shutoff clutch according to any one of claim 1 or 2.

16. The rotation drive device according to claim 15, further comprising a housing for accommodating the speed reduction mechanism portion and the reverse-input shutoff clutch.

* * * * *